United States Patent
Chen et al.

(10) Patent No.: US 8,351,691 B2
(45) Date of Patent: Jan. 8, 2013

(54) OBJECT EXTRACTION IN COLOUR COMPOUND DOCUMENTS

(75) Inventors: Yu-Ling Chen, Epping (AU); Ping Liu, Cheltenham (AU); Trevor Lee McDonell, Ingleburn (AU)

(73) Assignee: Canon Kabushiki Kaisha, Tokyo (JP)

( * ) Notice: Subject to any disclaimer, the term of this patent is extended or adjusted under 35 U.S.C. 154(b) by 603 days.

(21) Appl. No.: 12/637,446

(22) Filed: Dec. 14, 2009

(65) Prior Publication Data

US 2010/0157340 A1 Jun. 24, 2010

(30) Foreign Application Priority Data

Dec. 18, 2008 (AU) ................................ 2008260018
Dec. 18, 2008 (AU) ................................ 2008260130

(51) Int. Cl.
*G06K 9/00* (2006.01)
(52) U.S. Cl. ........ 382/165; 382/164; 382/180; 382/273; 358/1.9
(58) Field of Classification Search .................. 382/164, 382/165, 180, 273; 358/1.9
See application file for complete search history.

(56) References Cited

U.S. PATENT DOCUMENTS

| | | | |
|---|---|---|---|
| 5,680,497 A | 10/1997 | Seino et al. | |
| 5,856,877 A * | 1/1999 | Burger et al. | 358/452 |
| 6,298,357 B1 * | 10/2001 | Wexler et al. | 715/210 |
| 6,687,404 B1 * | 2/2004 | Hull et al. | 382/226 |
| 6,853,992 B2 * | 2/2005 | Igata | 707/741 |
| 6,983,068 B2 | 1/2006 | Prabhakar et al. | |
| 7,298,900 B2 * | 11/2007 | Kanatsu | 382/176 |
| 7,343,046 B2 | 3/2008 | Curry et al. | |
| 7,403,661 B2 | 7/2008 | Curry et al. | |
| 2002/0039439 A1 | 4/2002 | Nacken | |
| 2002/0085755 A1 | 7/2002 | Chi et al. | |
| 2007/0217701 A1 | 9/2007 | Liu et al. | |
| 2008/0123945 A1 | 5/2008 | Andrew et al. | |
| 2009/0148039 A1 | 6/2009 | Chen et al. | |

OTHER PUBLICATIONS

M. Acharyya, et al., "Document Image Segmentation Using Wavelet Scale-Space Features", IEEE Transactions on Circuits and Systems for Video Technology, vol. 12, No. 12, Dec. 2002, pp. 1117-1127.

* cited by examiner

*Primary Examiner* — Chan S Park
*Assistant Examiner* — Eueng-Nan Yeh
(74) *Attorney, Agent, or Firm* — Fitzpatrick, Cella, Harper & Scinto

(57) ABSTRACT

A method of text extraction in color compound documents is described. The method connects similarly colored pixels of an image of a color compound document into connected components (CCs); classifies each CC as either text or non-text; refines the text CC classification for each text CC using global color context statistics; groups text CCs into text blocks; recovers misclassified non-text CCs into a nearby text block; and removes extraneous CCs from each text block using local color context statistics to thereby provide the extracted text in the text blocks. Also described is a method of locating graphics objects in a color compound document image.

12 Claims, 32 Drawing Sheets

The beginning of the world, the end of the world. The beginning of the world, the end of the world. The beginning of the world, the end of the world. 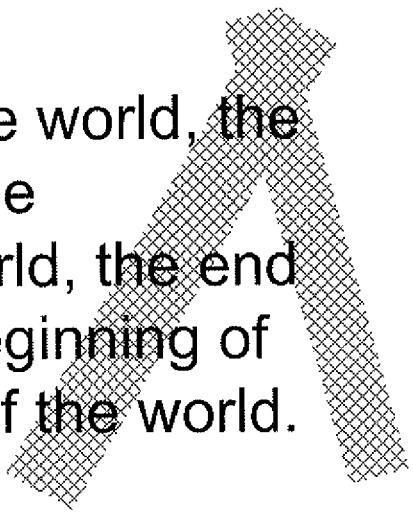

Fig. 31A

The beginning of the world, the 3101
end of the world. The
beginning of the world, the end 3102
of the world. The beginning of
the world, the end of the world.

Fig. 31B

The beginning of the world, the
end of the world. The
beginning of the world, the end
of the world. The beginning of
the world, the end of the world.

Fig. 31C

OBJECT EXTRACTION IN COLOUR COMPOUND DOCUMENTS

CROSS-REFERENCE TO RELATED PATENT APPLICATIONS

This application claims the right of priority under 35 U.S.C. §119 based on Australian Patent Application No. 2008260018, filed Dec. 18, 2008 and Australian Patent Application No. 2008260130, filed Dec. 18, 2008, which are incorporated by reference herein in their entirety as if fully set forth herein.

TECHNICAL FIELD

The present invention relates to document layout analysis of complex colour documents for storage and other processing and, in particular, to improving the accuracy of extracting objects such as text and non-text components from an image of the document.

BACKGROUND

The proliferation of imaging technology, combined with ever increasing computational processing power, has led to many advances in the area of document analysis. Document analysis systems may be used to extract semantic information from a scanned document. Such systems analyse images of documents to identify and extract content based information from various regions which collectively form the document. Typically, document analysis systems identify each of the various regions and classify the regions as text or non-text. This form of content based analysis is an important precursor to document management, synthesis and display processing. The results of this analysis can then be given to further processing which may perform various tasks such as optical character recognition (OCR) processing the text regions, compressing or enhancing the image regions, extracting non-text regions for reuse, and using content based compression techniques to reduce document image size.

One problem in document analysis is the accurate identification of text and non-text regions of images of a scanned document, particularly those including complex features such as photographs and line graphics. Popular applications of content analysis in a document management system include the generation of editable text, via optical character recognition (OCR), and the extraction of photographs and line graphics for later reuse.

The advent of powerful document editing tools and the proliferation of inexpensive colour printing systems have enabled the creation of complex colour documents, whose layouts are no longer restricted to the traditional rectangular layout style. Text and non-text often overlap without any geometric constraints, and unpredictable colour combinations are often used. Document analysis systems often employ a binarisation pre-processing step to reduce the amount of information in order to make the page layout analysis tasks less complicated. A popular method of extracting graphics regions in such systems is to look for large black connected components (CC) with low black density in the binarised image. However, having only two colours available in the analysis stages, binarisation-based document analysis systems often fail to handle some of the text and non-text colour combinations.

There are two major processing stages in any document analysis system—(i) segmenting a page into homogeneous regions, and (ii) classifying each homogeneous region into one of a set of predefined (content) classes. The choice of the number of classes depends on the purpose of the applications. A document analysis system that only needs to extract text from a page may only require text and non-text classifications. On the other hand a document analysis system that is targeted at document compression may have two classes, lossy and lossless, coupled to the choice of compression methods. The lossy regions may include photograph and background and the lossless regions may include text, graphics and background. A more complicated document analysis system may even have four classes, such as text, graphics, photo and background. Due to the growing complexity of document layouts and unpredictable colour combinations, it is becoming increasingly difficult to define a clear boundary between the two processing stages. Moreover segmenting a page into homogeneous regions is virtually impossible for documents with mixed content such as embedded text in graphics or photos.

For documents that need to have text, graphics and photographs ("photo") extracted separately, precision in content geometry and accuracy in content type classification are equally important. Cascaded classification methods are often used to achieve these two competing requirements. The most common cascaded approach firstly classifies a document image into text and non-text regions and then each non-text region is classified into graphics or photo. The accuracy of graphics extraction therefore has a compound dependency on the capability and accuracy of the two cascaded stages.

One known method uses edge features to extract flat regions such as text and graphics. The extracted flat regions are represented as overlaid single coloured layers with the non-extracted regions as a background image. This method is oriented more towards image compression than document analysis, and hence does not extract graphics objects explicitly.

Another known method of classifying a rectangular non-text region uses various features extracted from the whole region such as texture, colour histogram and edge statistics to determine whether this region should be classified as a picture or a graphics. This method assumes a rectangular non-text region has been extracted for further analysis but however does not consider the possibility of text being contained in the extracted rectangular non-text region. Moreover extracting non-rectangular non-text regions is, by itself, a challenging problem.

Another known method of classifying a document image into non-rectangular text and non-text regions builds a texture vector for each pixel on the document image using M-band wavelet filters. A K-means clustering method is then used to classify each pixel into either text or non-text based on the extracted texture vectors. Although this method is able to classify a document image into non-rectangular text and non-text regions, it is silent of how to classify a non-rectangular non-text region into graphics or photo as it demonstrates that the segmented text regions overlap with photos when the document image has text embedded into photos.

There is a need to accurately extract graphics regions from a colour document image with mixed contents and complex layouts.

Due to unpredictable colour combinations and potentially unrestrained intermingling of text and non-text regions present in such documents, a problem facing document analysis systems is the increase of image reproduction artefacts such as colour bleeding and noise. Such colour pollution may have been caused by printer anti-aliasing, scanner aliasing, halftone estimation, chromatic aberrations, and other blurring, haloing or fringing effects. The increase in layout complexity and colour reproduction errors consequently makes accurate extraction of content from colour documents significantly more challenging than for traditional black and white documents.

A basic approach to determining page content operates on a binary (black and white) version of the input scan image of the document, in order to avoid colour complexity. The conventional methods for text extraction in black and white documents are considered mature, and may still produce acceptable results for documents with limited colour combinations and rectangular layout styles. However, those methods do not address the problems associated with image reproduction errors or complex colour combinations. This binarisation approach fundamentally relies on applying a threshold to the input image, and may fail to correctly distinguish between foreground regions such as text, and the surrounding background pixels.

An alternative method is to process the colour document directly, often utilising a quantised colour version of the input to reduce processing complexity and remove several reproduction artefacts, such as halftone colours. Additionally, a method utilising colour quantisation can often correctly distinguish between colours that binarisation fails to separate. However, colour quantisation in and of itself cannot solve colour misrepresentation errors present in the source document such as colour bleeding, which may be retained by the quantisation process. This could result in information bearing objects that have colour fringing effects, or that have been quantised into multiple colours instead of remaining as flat-filled objects. Text decoration effects such as outline and shadow will also be retained by the colour segmentation process, which pose challenges for character recognition methods if both the text and decoration component are to be extracted.

There is a need to accurately identify and categorise the information bearing objects contained within mixed content document images possessing complex colour layouts.

SUMMARY

Disclosed is a connected component (CC) based text extraction method that includes refining text CC classification using global colour context statistics, grouping text CCs into text blocks, recovering misclassified non-text CCs into a nearby text block and removing erroneous CCs from each text block using local colour context statistics.

In accordance with one aspect of the present disclosure, there is a computer implemented method of text extraction in colour compound documents, said method comprising the steps of:

(a) connecting similarly coloured pixels of an image of a colour compound document into connected components (CCs);

(b) classifying each CC as either text or non-text;

(c) refining text CC classification for each text CC using global colour context statistics;

(d) grouping text CCs into text blocks;

(e) recovering misclassified non-text CCs into a nearby text block; and (f) removing extraneous CCs from each text block using local colour context statistics to thereby provide the extracted text in the text blocks.

Also disclosed is a CC based method of locating graphics objects in a colour compound document image that includes finding salient graphics components, deciding a graphics container to perform semantic analysis for each salient graphics component, profiling the descendents of graphics container to get semantic context statistics, and deciding whether the graphics container contains a whole or part of a graphics object based on semantic context statistics.

In accordance with another aspect of the present disclosure, there is provided a method of identifying at least one of a photo region and a graphics region in a colour bitmap image of a compound document, said method comprising the steps of:

(a) connecting similarly coloured pixels of said image into connected components and placing the connected components in an enclosure tree, the enclosure tree forming a hierarchy of ancestor and descendent connected components where an ancestor connected component encloses a descendent connected component wherein each node of the enclosure tree is a connected component;

(b) classifying each connected component into one of a plurality of classes wherein at least one class represents non-text connected components;

(c) selecting a connected component from one of the non-text connected components of the enclosure tree;

(d) calculating context statistics for the selected connected component based on descendent and touching sibling connected components of the selected connected component;

(e) identifying whether the selected connected component contains at least one of a photo region and a graphics region based on the context statistics; and (f) storing the selected connected component identified as either graphics or photo object to memory.

In accordance with another aspect of the present disclosure, there is provided a computer implemented method of locating graphics objects in a colour compound document image, said method comprising the steps of:

(a) connecting similarly coloured pixels of said image into connected components (CCs) and placing the CCs in an enclosure tree;

(b) classifying each CC into one of a plurality of classes wherein at least one class represents salient graphics components;

(c) identifying a graphics container to perform semantic analysis for each CC of said class representing salient graphics components;

(d) profiling descendents of said graphics container in said tree to obtain semantic context statistics; and (e) deciding whether the graphics container contains a whole or part of a graphics object based on said semantic context statistics.

According to another aspect of the present disclosure, there is provided a computer implemented method of identifying at least one of a photo region and a graphics region in a colour bitmap image of a compound document, said method comprising:

(a) connecting similarly coloured pixels of said image into connected components and placing the connected components in an enclosure tree, the enclosure tree forming a hierarchy of ancestor and descendent connected components where an ancestor connected component encloses a descendent connected component wherein each node of the enclosure tree is a connected component;

(b) classifying each connected component into one of a plurality of classes wherein at least one class represents non-text connected components;

(c) selecting a connected component from one of the non-text connected components of the enclosure tree;

(d) calculating context statistics for the selected connected component based on descendent and touching sibling connected components of the selected connected component;

(e) identifying whether the selected connected component contains at least one of a photo region and a graphics region based on the context statistics; and (f) storing the selected connected component identified as either graphics or photo object to memory.

Other aspects are also disclosed.

BRIEF DESCRIPTION OF THE DRAWINGS

At least one embodiment of the present invention will now be described with reference to the following drawings, in which:

FIG. 31A-31C are examples demonstrating how misclassified non-text CCs are recovered into a text block;

DETAILED DESCRIPTION INCLUDING BEST MODE

Figure 1:
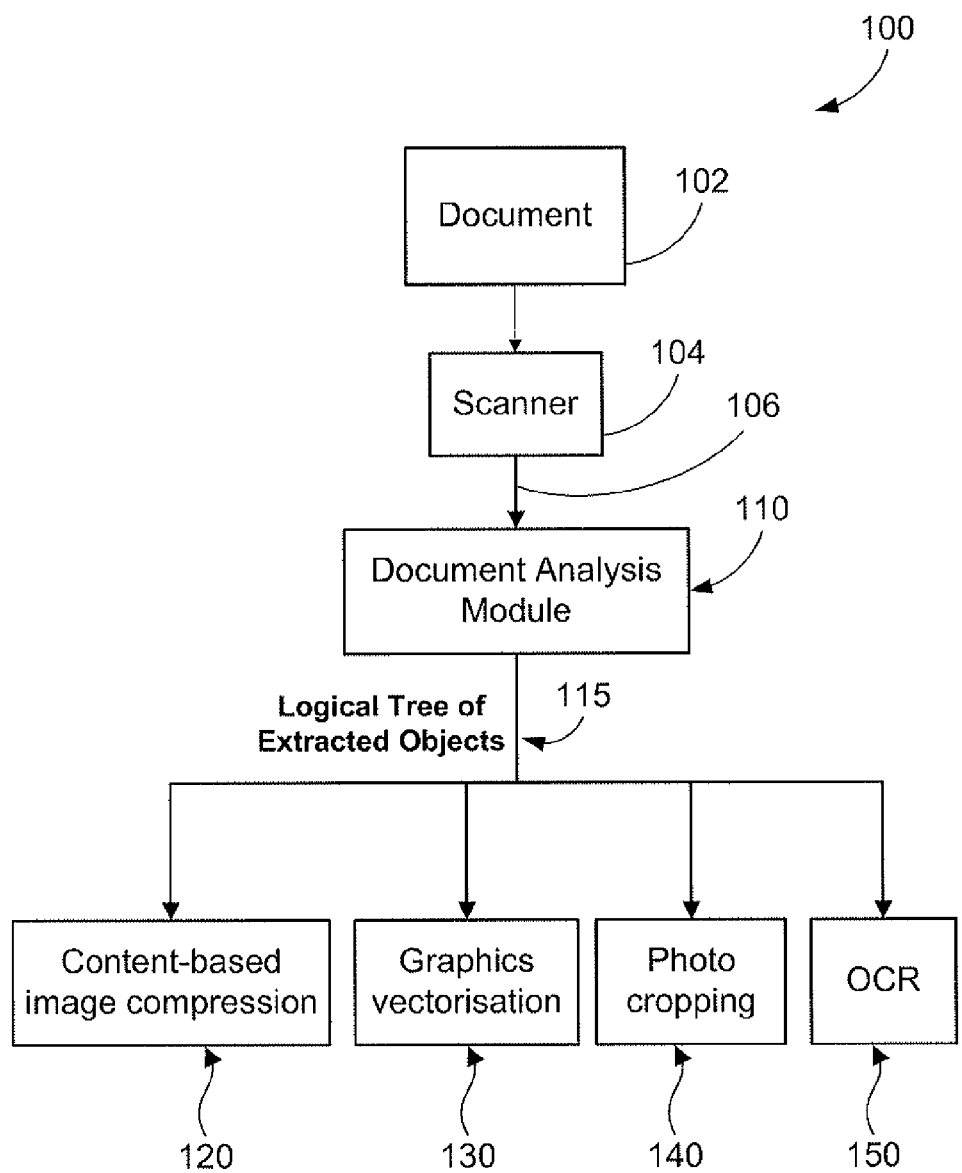
FIG. 1 is an application environment of a document analysis module in which the arrangements to be described can be used.

FIG. 1 shows an application environment 100 of a document analysis system. A hard copy document 102 is scanned by a scanner 104 to form an input scanned document image 106, which is often simply called the "input document". The scanned input document 106 is then subject to document analysis in a module 110 which extracts from the image portions or objects that may be independently further processed. The extracted objects may be output from the module 110 as a logical tree 115. Areas of a scanned document image can be compressed more efficiently using an algorithm suitable for the image content in each of those areas. The extracted objects from a document can be compressed separately each using an algorithm suitable for the extract object type. The extracted graphics objects can be vectorised (130) for re-use or compressed (120). Extracted photo objects can be cropped (140) for image retrieval and extracted text can be processed by OCR (150) to produce a searchable or an editable document.

Figure 2A:
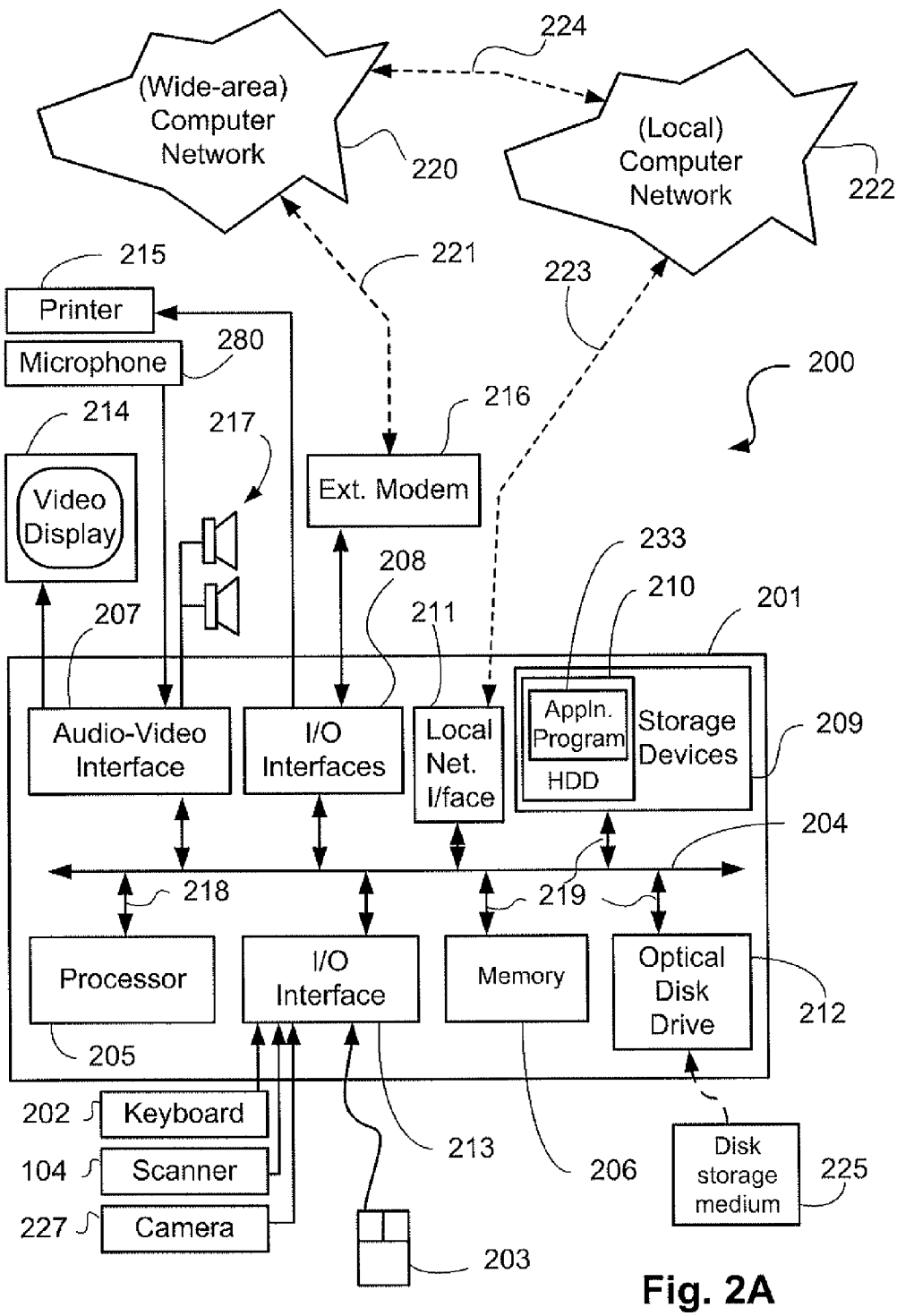
FIGS. 2A and 2B form a schematic block diagram of a general purpose computer system upon which the arrangements described can be practiced.
Figure 2B:
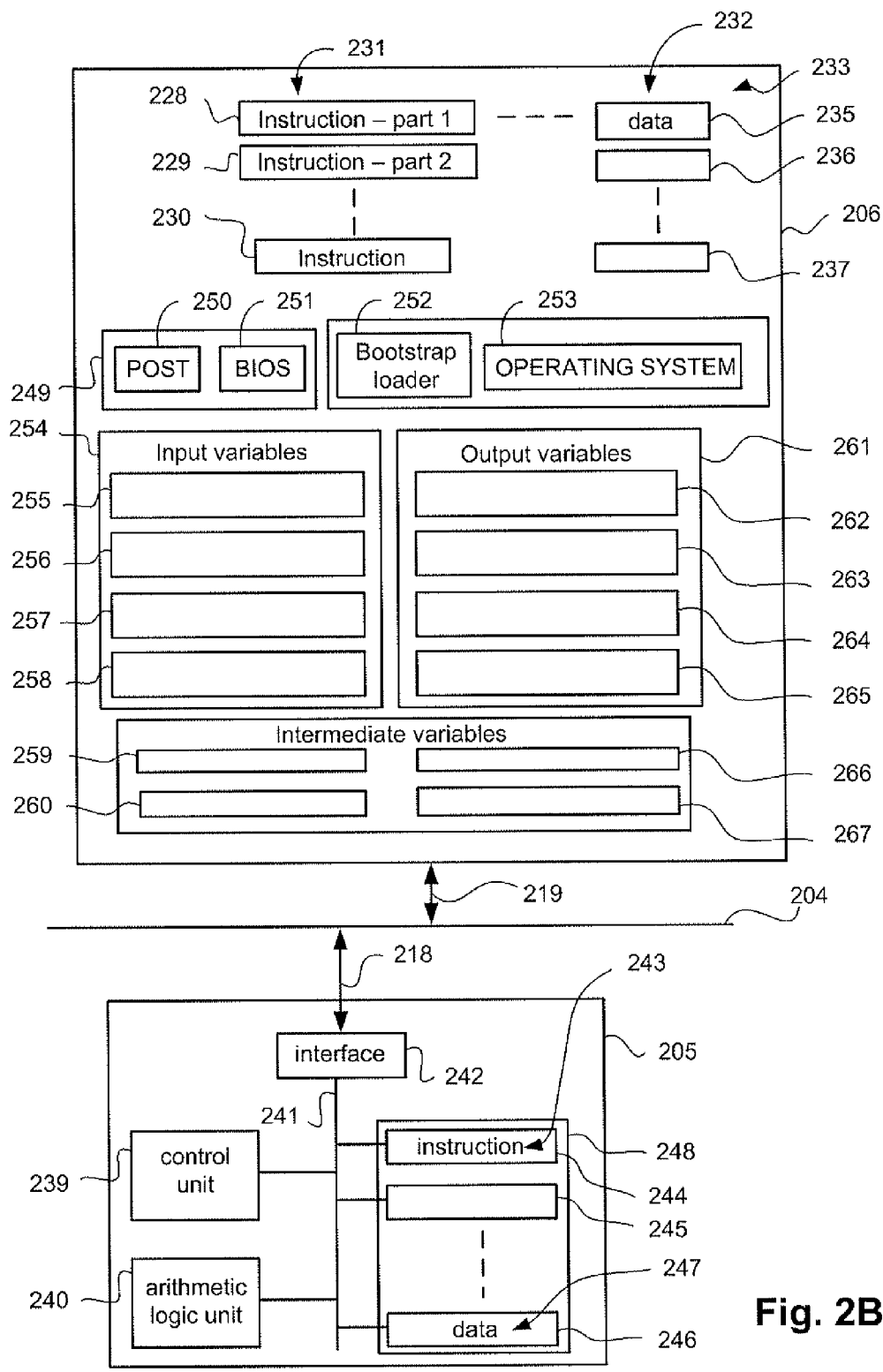

FIGS. 2A and 2B collectively form a schematic block diagram of a general purpose computer system 200, upon which the various arrangements described can be practiced.

As seen in FIG. 2A, the computer system 200 is formed by a computer module 201, input devices such as a keyboard 202, a mouse pointer device 203, the scanner 104, a camera 227, and a microphone 280, and output devices including a printer 215, a display device 214 and loudspeakers 217. An external Modulator-Demodulator (Modem) transceiver device 216 may be used by the computer module 201 for communicating to and from a communications network 220 via a connection 221. The network 220 may be a wide-area network (WAN), such as the Internet or a private WAN. Where the connection 221 is a telephone line, the modem 216 may be a traditional "dial-up" modem. Alternatively, where the connection 221 is a high capacity (eg: cable) connection, the modem 216 may be a broadband modem. A wireless modem may also be used for wireless connection to the network 220.

The computer module 201 typically includes at least one processor unit 205, and a memory unit 206 for example formed from semiconductor random access memory (RAM) and semiconductor read only memory (ROM). The module 201 also includes an number of input/output (I/O) interfaces including an audio-video interface 207 that couples to the video display 214, loudspeakers 217 and microphone 280, an I/O interface 213 for the keyboard 202, mouse 203, scanner 104, camera 227 and optionally a joystick (not illustrated), and an interface 208 for the external modem 216 and printer 215. In some implementations, the modem 216 may be incorporated within the computer module 201, for example within the interface 208. The computer module 201 also has a local network interface 211 which, via a connection 223, permits coupling of the computer system 200 to a local computer network 222, known as a Local Area Network (LAN). As also illustrated, the local network 222 may also couple to the wide network 220 via a connection 224, which would typically include a so-called "firewall" device or device of similar functionality. The interface 211 may be formed by an Ethernet™ circuit card, a Bluetooth™ wireless arrangement or an IEEE 802.11 wireless arrangement.

The interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (eg: CD-ROM, DVD), USB-RAM, and floppy disks for example may then be used as appropriate sources of data to the system 200.

The components 205 to 213 of the computer module 201 typically communicate via an interconnected bus 204 and in a manner which results in a conventional mode of operation of the computer system 200 known to those in the relevant art. Examples of computers on which the described arrangements can be practised include IBM-PC's and compatibles, Sun Sparcstations, Apple Mac™ or alike computer systems evolved therefrom.

The methods of document layout analysis described herein may be implemented using the computer system 200 wherein the processes of FIGS. 2C to 33B to be described, may be implemented as one or more software application programs 233 executable within the computer system 200. In particular, the steps of the methods of document analysis are effected by instructions 231 in the software 233 that are carried out within the computer system 200. The software instructions 231 may be formed as one or more code modules, each for performing one or more particular tasks. The software may also be divided into two separate parts, in which a first part and the corresponding code modules performs the document analysis methods and a second part and the corresponding code modules manage a user interface between the first part and the user.

The software 233 is generally loaded into the computer system 200 from a computer readable medium, and is then typically stored in the HDD 210, as illustrated in FIG. 2A, or the memory 206, after which the software 233 can be executed by the computer system 200. In some instances, the application programs 233 may be supplied to the user encoded on one or more CD-ROM 225 and read via the corresponding drive 212 prior to storage in the memory 210 or 206. Alternatively the software 233 may be read by the computer system 200 from the networks 220 or 222 or loaded into the computer system 200 from other computer readable media. Computer readable storage media refers to any storage medium that participates in providing instructions and/or data to the computer system 200 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 201. Examples of computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory devices (including the HDD 210 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206. A program permanently stored in a hardware device such as the ROM 249 is sometimes referred to as firmware. The POST program 250 examines hardware within the computer module 201 to ensure proper functioning, and typically checks the processor 205, the memory (209, 206), and a basic input-output systems software (BIOS) module 251, also typically stored in the ROM 249, for correct operation. Once the POST program 250 has run successfully, the BIOS 251 activates the hard disk drive 210. Activation of the hard disk drive 210 causes a bootstrap loader program 252 that is resident on the hard disk drive 210 to execute via the processor 205. This loads an operating system 253 into the RAM memory 206 upon which the operating system 253 commences operation. The operating system 253 is a system level application, executable by the processor 205, to fulfil various high level functions, including processor management, memory management, device management, storage management, software application interface, and generic user interface.

The operating system 253 manages the memory (209, 206) in order to ensure that each process or application running on the computer module 201 has sufficient memory in which to execute without colliding with memory allocated to another process. Furthermore, the different types of memory available in the system 200 must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

The processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal buses 241 functionally interconnect these functional modules. The processor 205 typically also has one or more interfaces 242 for communicating with external devices via the system bus 204, using a connection 218.

The application program 233 includes a sequence of instructions 231 that may include conditional branch and loop instructions. The program 233 may also include data 232 which is used in execution of the program 233. The instructions 231 and the data 232 are stored in memory locations 228-230 and 235-237 respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228-229.

In general, the processor 205 is given a set of instructions which are executed therein. The processor 205 then waits for a subsequent input, to which it reacts to by executing another set of instructions. Each input may be provided from one or more of a number of sources, including data generated by one or more of the input devices 202, 203, data received from an external source across one of the networks 220, 222, data retrieved from one of the storage devices 206, 209 or data retrieved from a storage medium 225 inserted into the corresponding reader 212. The execution of a set of the instructions may in some cases result in output of data. Execution may also involve storing data or variables to the memory 234.

The disclosed document analysis arrangements use input variables 254, that are stored in the memory 234 in corresponding memory locations 255-258. The document analysis arrangements produce output variables 261, that are stored in the memory 234 in corresponding memory locations 262-265. Intermediate variables may be stored in memory locations 259, 260, 266 and 267.

The register section 244-246, the arithmetic logic unit (ALU) 240, and the control unit 239 of the processor 205 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 2C to 33B is associated with one or more segments of the program 233, and is performed by the register section 244-247, the ALU 240, and the control unit 239 in the processor 205 working together to perform the fetch, decode, and execute cycles for every instruction in the instruction set for the noted segments of the program 233.

Figure 2C:
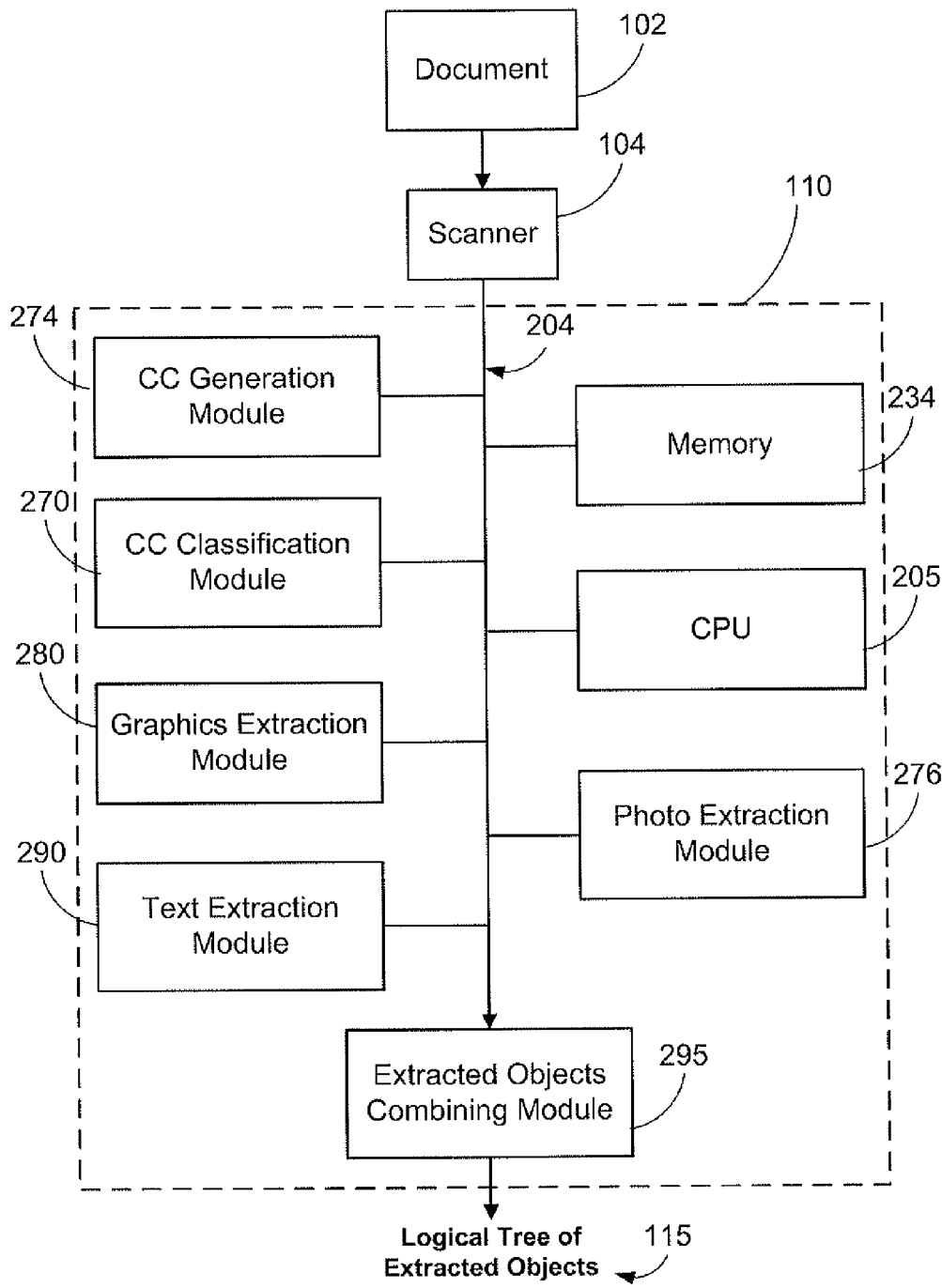
FIG. 2C is a block diagram of the constituent software architecture of a document analysis apparatus.

FIG. 2C shows schematically the exemplary software architecture of the document analysis module 110 which is seen to include the processor, or "computational processing unit (CPU) 205, the memory module 234, and a number of software code modules, particularly a CC generation module 274, a CC classification module 270, a graphics extraction module 280, a photo extraction module 276 and a text extraction module 290. The modules seen in FIG. 2C are operationally, if not physically, coupled together via the common bus 204. The document analysis module 110 is illustrated in FIG. 2C using a bus architecture diagram. Other types of configuration may be used to implement one or more of the components. In the present arrangement, a computer program is stored in the memory 234 and is executable by in the CPU 205 to implement the functionality of each of the CC generation module 274, the CC classification module 270, the graphics extraction module 280, the photo extraction module 276 and the text extraction module 290. A further module 295, also implementable as part of the computer program, is operable to combine the extracted objects to output the logical tree of extracted objects 115. An image of the document 102 as scanned by the scanner 104 is stored in the memory 234 whereupon the image is acted upon by the modules which in turn use the memory 234 for intermediate storage of image components and text extracted or otherwise processed from the scanned image.

Figure 3:
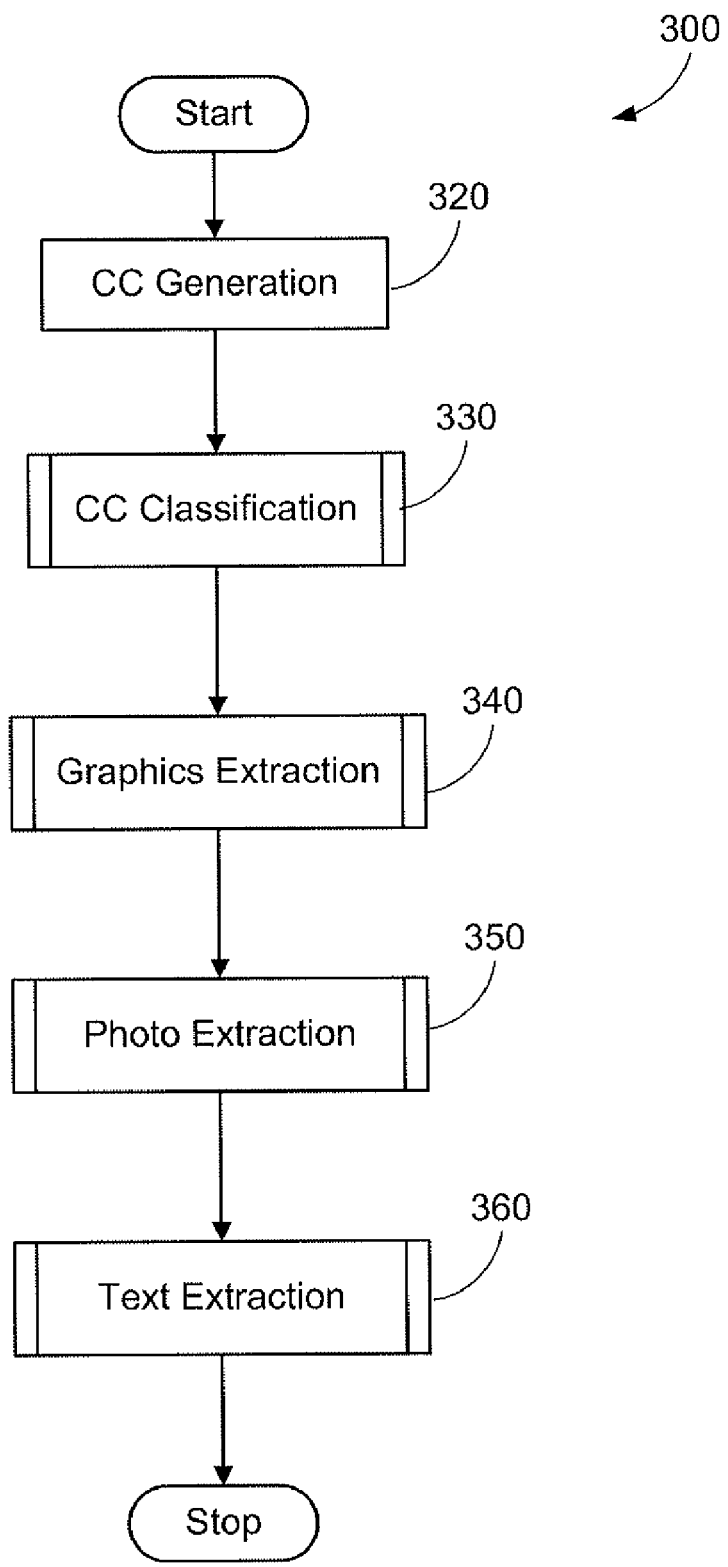
FIG. 3 is a processing flow of the document analysis module.

FIG. 3 is a processing flow of a document analysis method 300 that is performed by the aforementioned computer program of the document analysis module 110. The processes 320, 330, 340, 350, and 360 of the method 300 of FIG. 3 correspond to the modules 274, 270, 280, 276, and 290 in FIG. 2C respectively. Process 320 generates CCs from a scanned input image 106 and places the generated CCs in an enclosure tree. Process 330 classifies the generated CCs into different types according to the characteristics of each CC. Process 340 finds or identifies those CCs with salient graphics features and then performs semantic analysis on them to extract graphics objects. Process 350 finds photo seeds from CCs with high photo probability and then checks the semantic relationship in the enclosure tree from the neighbourhood of the photo seeds to extract photo objects. Process 360 groups CCs that remain as text after graphics and photo extraction and refines those grouped CCs to form text lines or paragraphs. Each of these processes will be explained in more detail below.

Each of the processes 320-360 operates to group CCs with similar properties to form semantic objects. There are three kinds of groups mentioned in this description—text groups, photo groups and graphics groups. A text group represents a text line or paragraph on a page. A graphics group represents a graphics object on a page. A photo group represents an isolated photographic region enclosed by the main background. A group is a logical entity that is represented in the memory 234 as a stored list of all CCs that make up the group.

Figure 4:
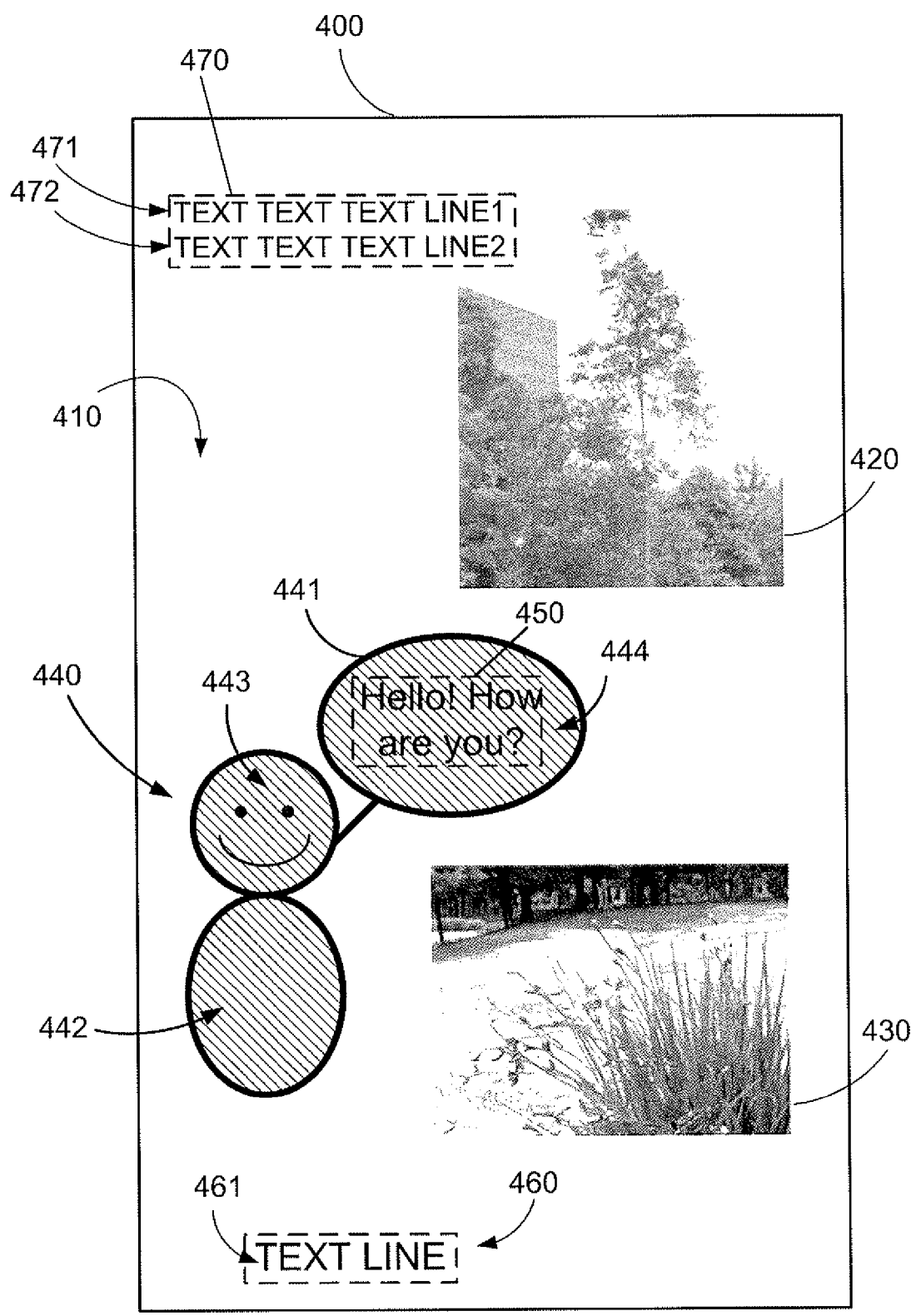
FIG. 4 is an example input page with photo, graphics and text groups.

FIG. 4 shows a sample page 400 which may exemplify an input scanned image 106. The sample page 400 has a main background 410 and groups 420, 430, 440, 450, 460, and 470. Each of the groups 420, 430, 440, 450, 460, 470 is made up of multiple CCs and corresponds to a semantic object on the input page 400. The CCs belonging to the same group are grouped together and are maintained as a list in the memory 234. Each of the groups 420 and 430 corresponds to a photo group. The group 440 (a snowman) consists of an outline part 441 and three interior parts 442, 443 and 444 which are grouped together to represent a graphics object. The group 460 is a text group consisting of a line of text 461, and the group 470 is a text group consisting of lines of text 471 and 472. The group 450 is a text group which overlaps with the interior part 444 and thus the group 440.

The detail of each process 320-360 will be explained further in the following sections.

CC Generation

Figure 5:
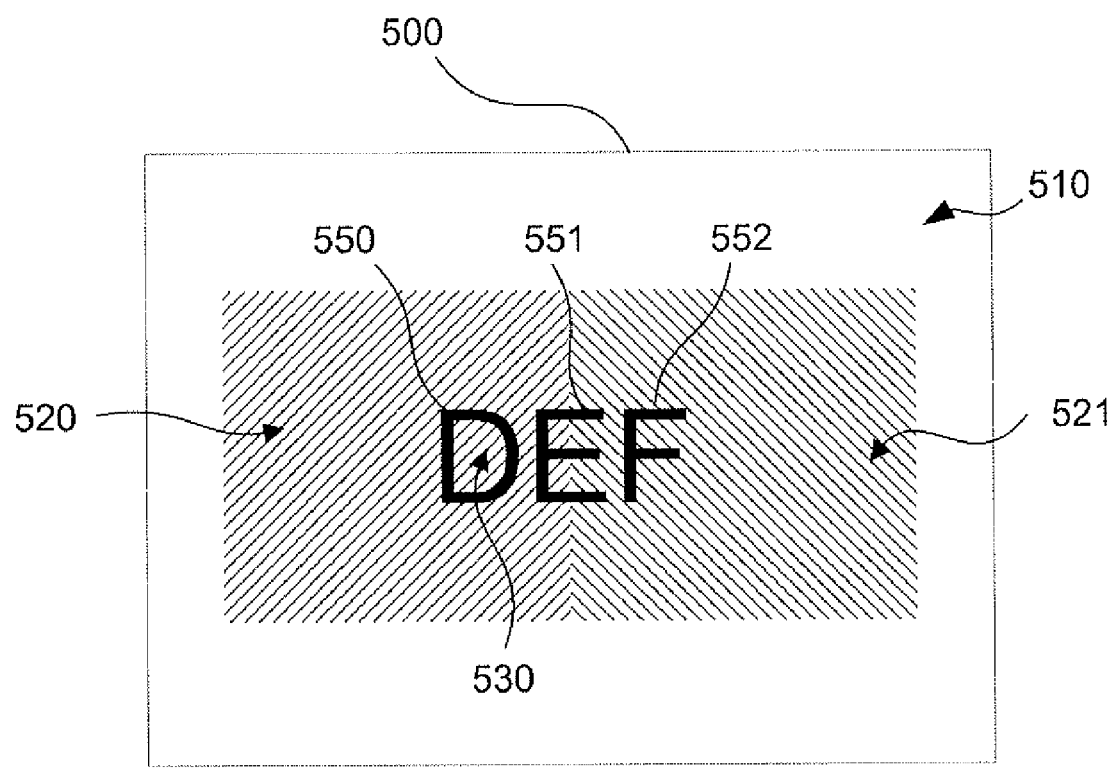
FIG. 5 is an example input page with a number of objects occluding the background and other objects.

Process 320 builds an enclosure tree of CCs. CCs represent a group of connected pixels with a perceptually uniform colour. There are many different ways of generating CCs from an image. CC generation methods are well known in the art. One method is to divide the colour space into a small number of compartments and place all the colours on the document image 106 into one of these compartments by determining the colour similarity. This forms a colour quantised document as a digital image with limited colours. A connected component is formed by contiguous pixels of the same colour on the colour quantised document image. FIG. 5 shows a sample page 500 and the constructed enclosure tree for this page is shown in FIG. 6.

In FIG. 5, the sample input page 500 includes a main page background 510 with other objects of interest. Areas 520 and 521 are background regions having different colours from each other, as depicted by the different shading thereof. Each of the letters "D" 550, "E" 551 and "F" 552 are placed on top of these solid background areas 520 and 521 and have different colours from the areas 520 and 521. Letter "E" 551 occludes parts of both background areas 520 and 521, while letters "D" 550 and "F" 552 only occlude parts of the areas 520 and 521 respectively. Additionally, the letter "D" 550 also results in a background segment 530, which is cut or otherwise isolated from a remainder of the background 520.

Figure 6:
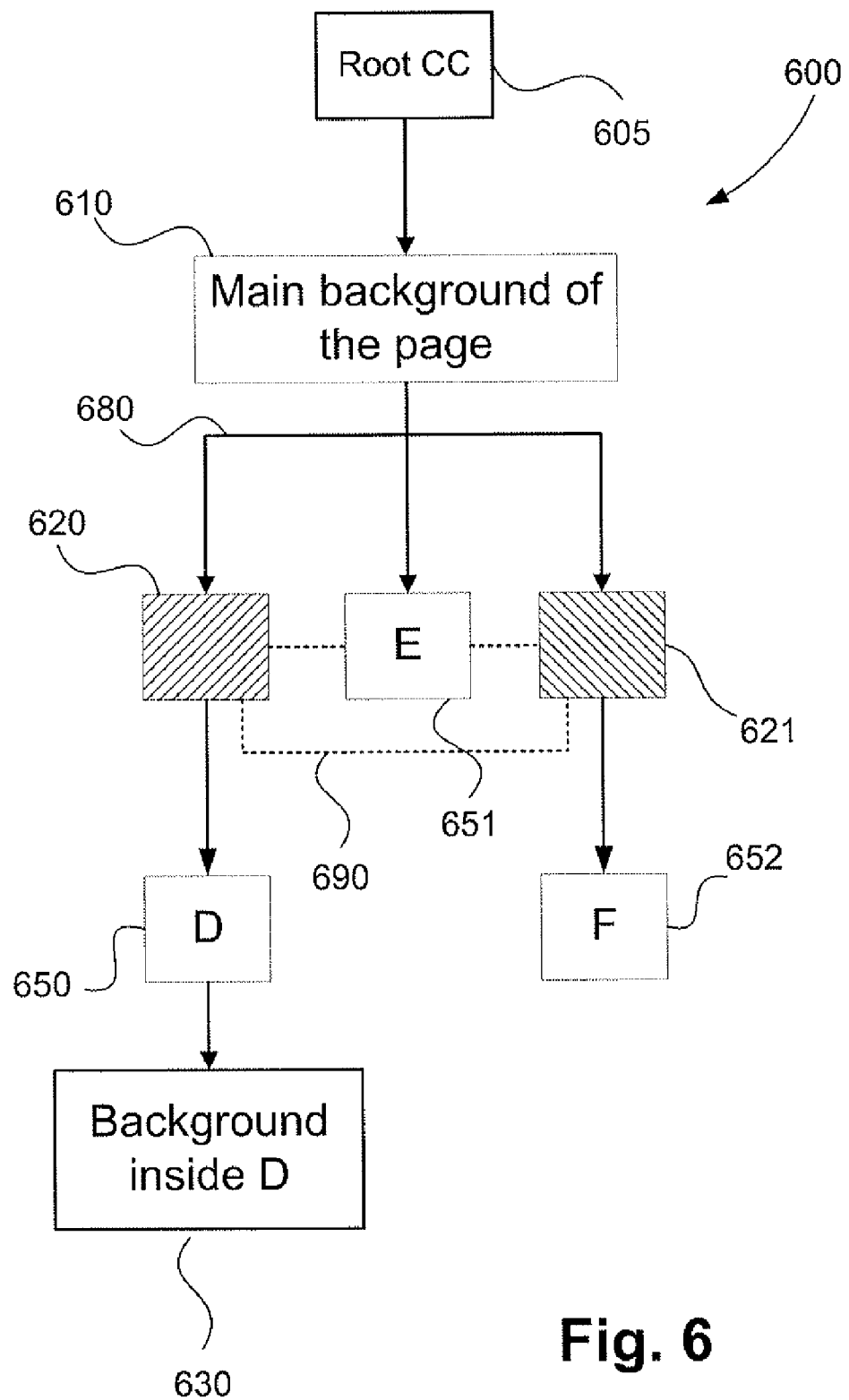
FIG. 6 is a representation of an enclosure tree which is generated by applying a CC generation process to FIG. 5.

FIG. 6 shows an example of an enclosure tree 600 produced by the CC analysis that is applied to the page 500. A root 605 of the enclosure tree, Root CC, is a virtual node that contains the main background 510 of the page 610. Nodes of the tree 600 are linked using two kinds of link: an enclosing relationship link, such as the link 680 shown by a solid arrow, and a touching relationship link, such as the link 690 shown by a dotted line. An object on the page is enclosed by a second object when there is a closed path of pixels from the second object that surrounds the first object. In the example page 500 in FIG. 5, the letter "D" 550 is enclosed by background region 520, but letter "E" 551 is not enclosed by either background region 520 or 521, as there is no surrounding closed pixel path from either of these background regions. The letter "E" is enclosed by the page background object 510. As such, the enclosure information produces a tree as described further below. Background regions 520 and 521 produce nodes 620 and 621 respectively in the tree 600, which are each children of the page background node 610. Letters "D" 550, "E" 551, and "F" 552 produce nodes 650, 651, and 652 respectively. The region 530 inside of letter "D" 550 produces the node 630 which is a child of the node 650, containing the letter "D". Along with the enclosing information, some nodes include touching information. Touching link 690 between the pair of nodes 620 and 621 corresponds to the touching of the pair objects 520 and 521. Other touching links in the graph 600 correspond to the touching relationships between the objects on the page.

CCs with the same parent node are siblings. A CC may touch its siblings, children, or parent. Most CCs touch their parent because there is a closed path of pixels that enclose the child. This is seen in FIG. 6 where the node 651 touches two siblings 620 and 621, but does not touch its parent node 610. In order to correctly form an enclosure tree, care has to be taken with how pixels are connected to form CCs. If pixels are connected 8-ways, it is possible to construct two CCs which enclose each other, destroying the tree property of the enclosure tree. Connecting pixels 4-ways or 6-ways does not have this problem and allows a proper enclosure tree to be formed.

When a CC is generated and placed in the enclosure tree, the following properties are also derived:

| CC Properties | Definitions |
| --- | --- |
| Bounding Box (BB) | The minimum axis-aligned rectangle that completely circumscribes the CC |
| Bounding Box Area | The area of the Bounding Box rectangle |
| Aspect Ratio (AR) | The ratio of the Bounding Box width to Bounding Box height |
| Self Pixel Count | The number of pixels that make up the CC |
| Total Pixel Count | The sum of Self Pixel Count of the CC and all its enclosed descendants |
| Coverage | The ratio of Self Pixel Count to Bounding Box Area of the CC |
| Pixel Run Count | The number of Pixel Runs that make up the CC wherein a Pixel Run is a set of consecutive pixels in the same row |
| Edge Ratio | The ratio of the number of perimeter pixels of a CC to Self Pixel Count |
| Number of Touching | The number of touching siblings |
| Number of Enclosed | The number of enclosed CCs |
| Touching List | A list of touching siblings |
| Enclosing list | A list of enclosed child CCs |
| Descendent Count | The number of CCs included in the sub-tree |
| Noise Pixel Count | The number of salt and pepper noise pixels in the CC |
| Enclosed Pixel Count | Total Pixel Count − Self Pixel Count |

CC Classification

The process 330 classifies the CCs in the enclosure tree into different types based on each CC's properties. After each CC is assigned an initial classification, more properties can be deduced from the context created by the semantic relationship of the enclosure tree. These additional properties may then be used to optimise the CC classification, and some CCs may have their classifications changed as a result.

Using the properties of each CC, a CC is classified into one of the following types:

| | |
| --- | --- |
| NOISE | Small element without meaning |
| TEXT | Part of a text character |
| FRAME | Thin and may be part of a table frame |
| TB_CELL | Enclosed by a FRAME CC and may be a table cell |
| G_FILL | Part of the inside solid region of a graphics object |
| G_OUTLINE | Part of the outline of a graphics object |
| PHOTO | Part of a photo region |
| BG | Part of a solid or flat background region |
| LINE | Part of a line object |

All thresholds and cheeks mentioned below are optimised for documents scanned at a resolution of 300 dots per inch (DPI) and may be scaled as necessary for documents scanned at a different resolution. In the following sections, non-text (NT) refers to classification types—TB_CELL, PHOTO, G_FILL, G_OUTLINE, FRAME, LINE and BG. Colour similarity referred to in this description is the visual similarity of two colours. The description hereafter assumes two colours are similar if the Euclidean distance between them is less than a predetermined threshold (eg. 40 when the colour space is YCbCr, with each colour channel normalised to the range of 0 to 255).

Figure 7:
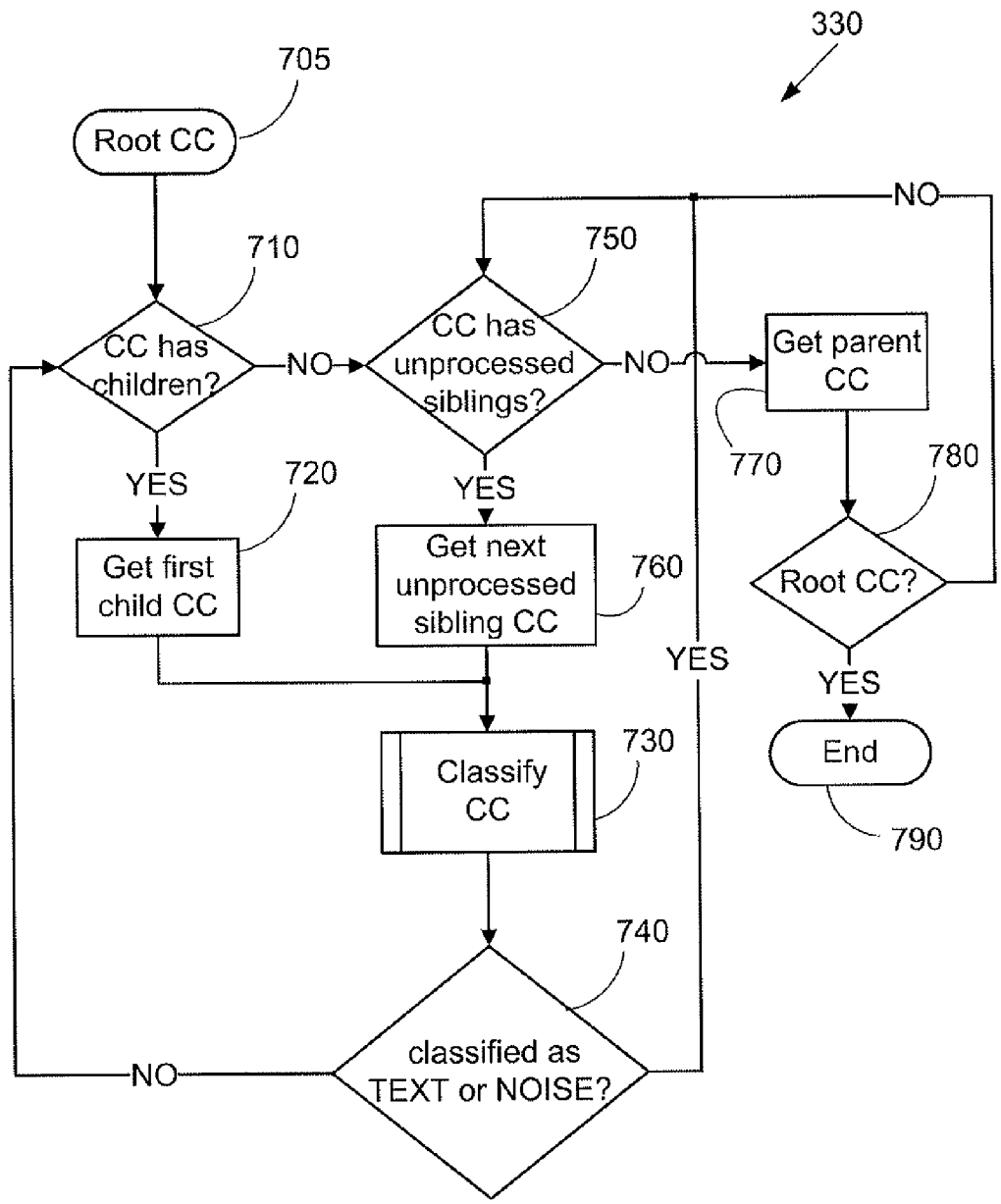
FIG. 7 is a processing flow diagram showing the traversal of the CC enclosure tree for CC classification.

The CC enclosure tree is traversed in a depth first order and parent CCs are classified before their children. FIG. 7 is a flowchart of the process 330 showing the order in which CCs in the enclosure tree are classified. Traversal of the tree 600 starts from the root CC 705 of the page. Step 710 checks if the CC has any children. If the CC has children then the first child is retrieved at step 720 and is then sent to the classifier at step 730. If the CC does not have children as determined at step 710, then a new CC for classification is found at step 750 by checking for unprocessed siblings. If no unprocessed siblings are found in step 750, then a new CC for classification is found by traversing to the parent of the CC at step 770. Where the parent is the root CC, as determined at step 780, the process ends at step 790. If not the root CC, the parent node is then checked again at step 750 to determine if the parent has any unprocessed siblings. This process is repeated until an unprocessed sibling is found. Where unprocessed siblings are found at step 750, step 760 follows and the next unprocessed sibling is retrieved for classification in step 730. The flow proceeds in depth first order, the children of a CC are classified before its siblings, except when the classifier of step 730 classifies the CC as NOISE or TEXT, which is tested in step 740. In the case when the classifier classifies the CC as TEXT or NOISE, then the next CC to be classified is found by looking for an unprocessed sibling at step 750.

The classification process of step 730 does not classify children of TEXT or NOISE CCs, whereas children of non-text CCs are classified, as is evident from step 740. This is based on the observation that text is unlikely to be a container for other page elements. Referring back to FIG. 6, showing the CC enclosure tree for the page of FIG. 5, the order in which the nodes are processed is 610, 620, 650, 651, 621, and 652.

The classification process 730 classifies the CC based on the coverage, aspect ratio, height and width, and colour of the touching siblings and parent. The classification process labels all the CCs on the CC enclosure tree and this forms a basis for further analysis in the later stages. The output of the classification process 730 is cascaded through the document analysis pipeline to refine the accuracy of classification.

Figure 8:
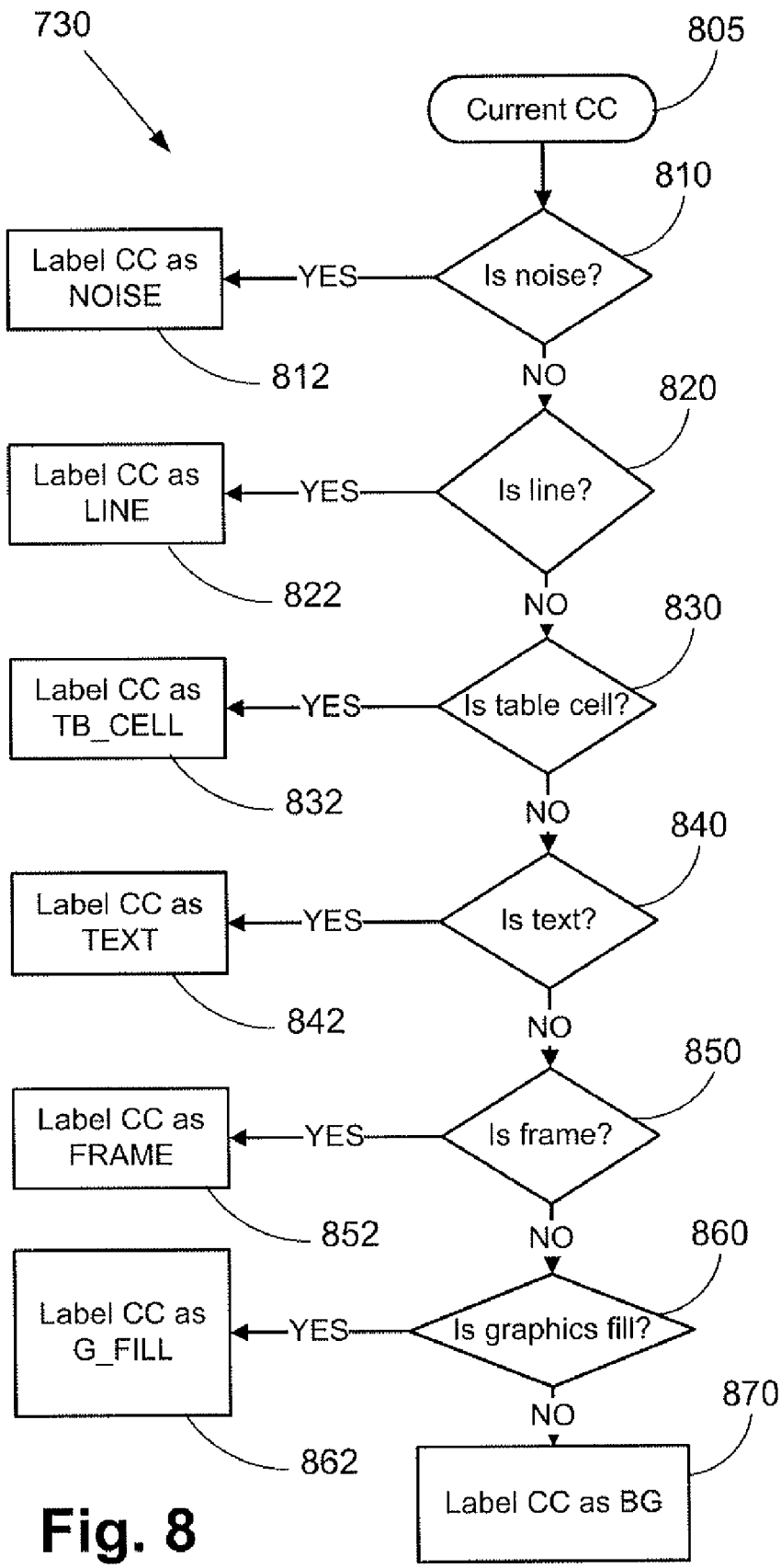
FIG. 8 is a detailed flowchart of the CC classification process in FIG. 7.

FIG. 8 is a flowchart for the CC classification process 730 which operates on a current CC 805.

In step 810, a CC is labelled as NOISE 812 if the Self Pixel Count property of the CC, as discussed above, is less than a threshold (eg. 4), or if the CC contains too many noise pixels (eg. Noise Pixel Count greater than 25% of Self Pixel Count).

In step 820, a CC is labelled as LINE 822 if all of the following conditions are satisfied:

(i) Aspect Ratio is greater than a threshold (eg. 10), indicating a horizontal line, or is less than a threshold (eg. 0.1), indicating a vertical line;

(ii) the CC does not have any children (because a line does not contain/enclose other regions);

(iii) Width or height of the Bounding Box of the CC is greater than a threshold (eg. 100, any smaller than this might not be a line but a character like '-' or '|');

In step 830, a CC is labelled as TB_CELL 832 if all of the following conditions are satisfied:

(i) The CC is enclosed by a CC classified as FRAME;

(ii) Does not have too many siblings (eg. less than a pre-determined number, such as 20);

(iii) Edge Ratio is lower than a threshold (eg. 0.7);

(iv) The CC does not have any touching siblings, or the CC is bigger than any of the CC's touching siblings which overlaps the CC's Bounding Box by more than 80%.

In step 840, a CC is labelled as TEXT 842 if all of the following conditions are satisfied:

(i) Both the dimensions of the Bounding Box of the CC are less than a threshold (eg. 320 pixels);

(ii) The depth of the sub-tree of the CC is less than a threshold (eg. 4);

(iii) Descendent Count is less than a threshold (eg. 15);

(iv) Coverage is greater than a threshold (eg. 14%);

(v) Pixel Run Count is within a predefined range derived from BB height, AR, and the larger of BB dimension.

In step 850, a CC is labelled as a FRAME 852 if all of the following conditions are satisfied:

(i) The Self Pixel Count of the CC is greater than a threshold (eg. 256);

(ii) The ratio of the Self Pixel Count of the CC to the Bounding Box Area of the CC is less than a threshold (eg. 0.25).

(iii) Edge Ratio is greater than a threshold (eg. 0.3)

In step 860, a CC is labelled G_FILL 862 if the CC does not have any descendants.

In step 870, a CC not classified in steps 810-860 is labelled as BC.

After all the CCs have been classified, the classification process revisits the CCs labelled as FRAME and examines whether the CC encloses a table structure. A FRAME CC is determined to hold a table structure, if any of the two conditions below is met:

(i) The majority (eg. more than 90% of Number of Enclosed of the FRAME CC) of the children of the FRAME CC are rectangular (eg. the ratio of Total Pixel Count of the child CC to the Bounding Box Area of the child CC is greater than a threshold (eg. 0.9);

(ii) The ratio of the sum of Total Pixel Count of all the child CCs to Enclosed Pixel Count of the FRAME CC is greater than a threshold (eg. 0.9).

If none of the above conditions is satisfied then the classification of the CC is changed from FRAME to G_OUTLINE.

The CC classifier 730 additionally creates a text profile histogram for each of the non-text CCs in the enclosure tree. The text profile and text histogram is calculated for each of the non-text CCs with TEXT CC children. The histogram is a density histogram and is generated by first finding the mean pixel count of the enclosed TEXT classified CCs, which is the sum of the Self Pixel Count of all the TEXT children divided by the total number of TEXT children. i.e.:

$$\text{Mean}, m = \sum_n (\text{Self Pixel Count of TEXT } CC)/n,$$

where n is the total number of TEXT CCs.

The TEXT children CCs of a non-text CC are categorised into three bins or groups, small, average and large, based on their Self Pixel Count. The size classifications for the text size histogram bins are (a) less than half of the sum of Self Pixel Count of the smallest TEXT CC and the average pixel count for the small bin; (b) greater than half the sum of Self Pixel Count of the largest TEXT CC and the average pixel count for the large bin; and (c) all TEXT CCs which are not placed in either the small bin or large bin are placed into the average bin. Along with the count of TEXT CCs in the histogram bins, other measures of statistical interest and importance include; (a) the mean of Self Pixel Count of TEXT children; and (b) the variance of Self Pixel Count of the TEXT children of a given container.

The Coverage of the TEXT CCs of a non-text CC are also categorised into three bins—low, medium and high. The pixel coverage classifications for the three coverage histogram bins are (a) less than 40% for the low bin; (b) greater 80% for the high bin; and (c) all TEXT CCs which are not placed in either the low bin or high bin are placed into the medium bin.

Text characters that constitute a text line or paragraph normally have similar characteristics. These characters are typically enclosed by a common background region. As a result, analysing the profiled statistics of TEXT classified children can help to determine whether the non-text CC is a good text container.

Figure 9A:
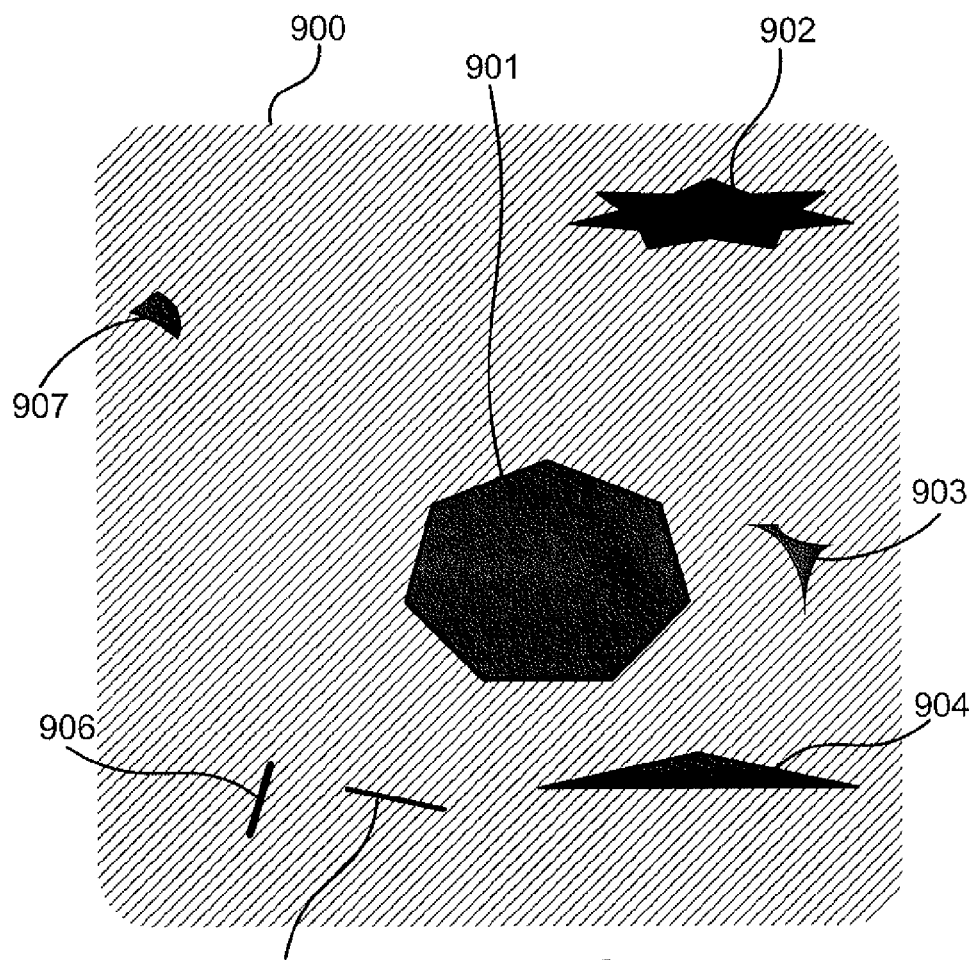
FIG. 9A is an example of a bad text container.
Figure 9B:
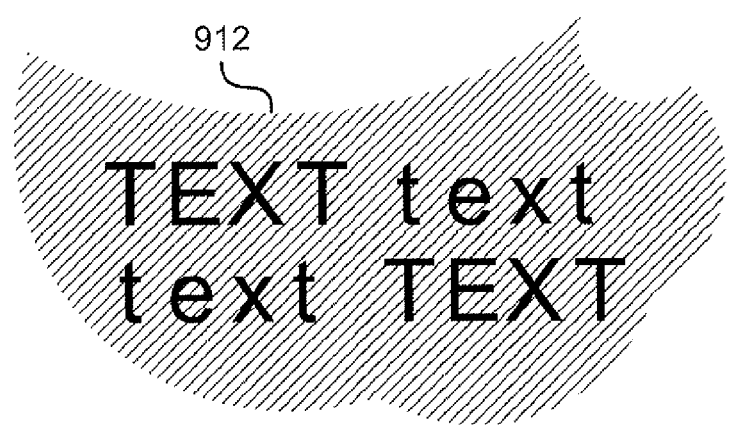
FIG. 9B is an example of a good text container.

FIGS. 9A and 9B show examples of how the profiled statistics of TEXT classified children is used to determine a good text container. In FIG. 9A a CC 900 is a non-text CC that encloses other TEXT children CCs 901, 902, 903, 904, 905, 906, and 907. Similarly the non-text CC 912 in FIG. 9B encloses some TEXT children CCs. A good text container (i.e. containing actual text) contains TEXT classified children with the following characteristics:

Number of TEXT classified children is greater than a threshold. (eg. 15; when there are not enough samples, the result is not reliable.)

The mean of Self Pixel Count of TEXT children is greater than a threshold. (eg. 40)

The variance of Self Pixel Count of the TEXT children is less than a threshold (eg. mean*mean*3).

FIG. 9B is therefore an example of a good text container and FIG. 9A is an example of a bad text container. Only a non-text CC can contain TEXT CCs. Children of a TEXT CC are considered to be the cut-off parts of background.

The profiled statistics of TEXT classified children for each non-text CC is further used in the photo extraction process and will be explained further in the photo extraction section.

Graphics Extraction

Figure 10:
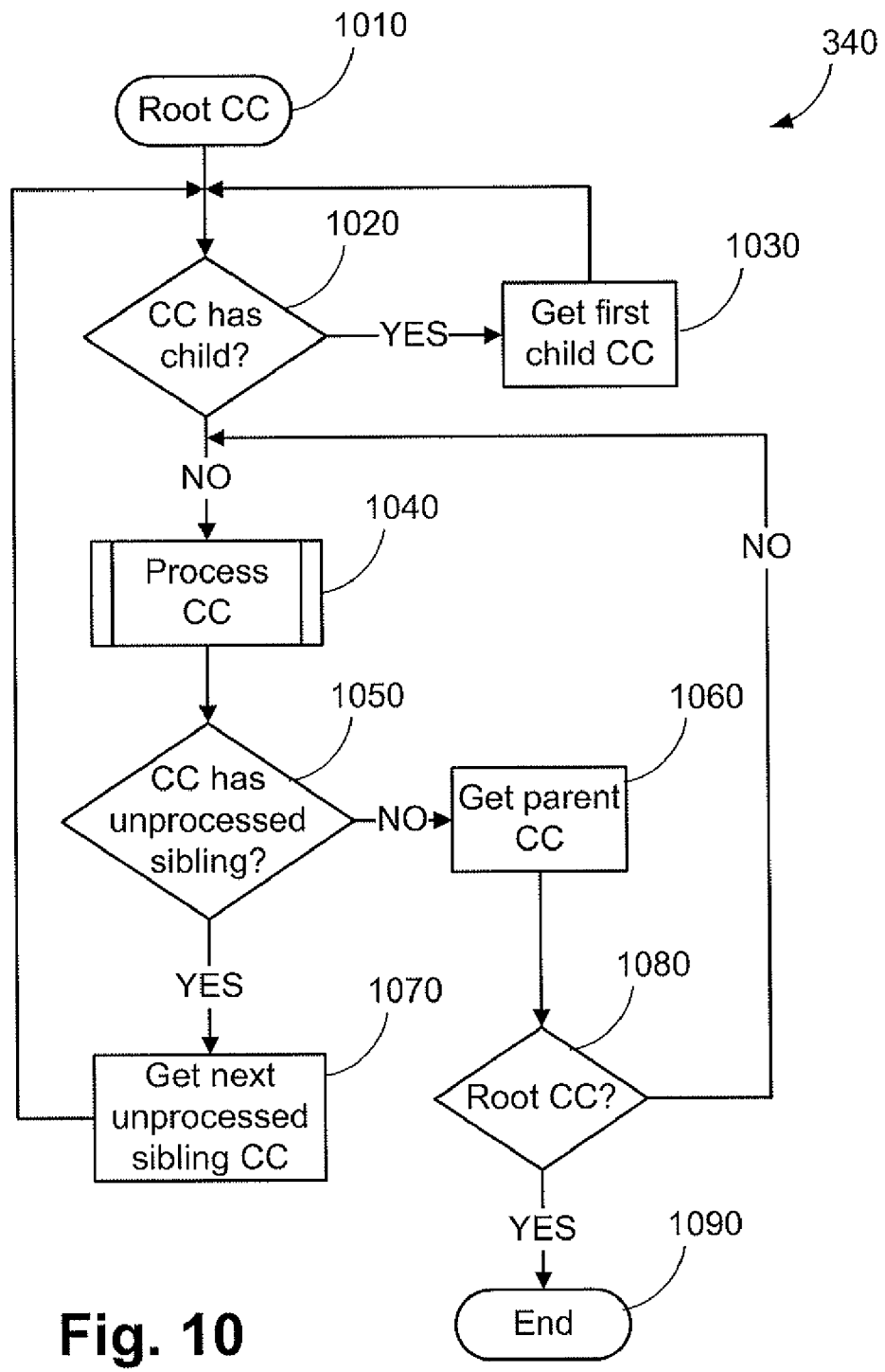
FIG. 10 is a processing flow of the graphics extraction process in FIG. 2.

FIG. 10 shows the flowchart of the graphics extraction process 340 from a CC enclosure tree 600.

The CC tree 600 is traversed in bottom up, children first order and each CC is processed for graphics extraction. The process 340 commences at step 1010 at the root CC of the page image. If the CC has children, as determined in step 1020, then the first child CC is considered in step 1030. These two steps then continue until a CC without any children is found. This CC is then processed in step 1040 for graphics extraction. A new CC is then found by checking in step 1050 if the current CC has an unprocessed sibling. If such a sibling exists, then that sibling is found or retrieved in step 1070 by traversing the tree 600 in memory 234. The process 340 then returns to step 1020 where that CC is again checked for children, and any children found are processed first. If the CC has no unprocessed siblings (step 1050), then the parent CC is retrieved in step 1060. If the retrieved parent CC is the root CC as tested in step 1080, then processing stops at step 1090. Otherwise the parent CC is processed at step 1040, as all of its children have already been processed.

Figure 11:
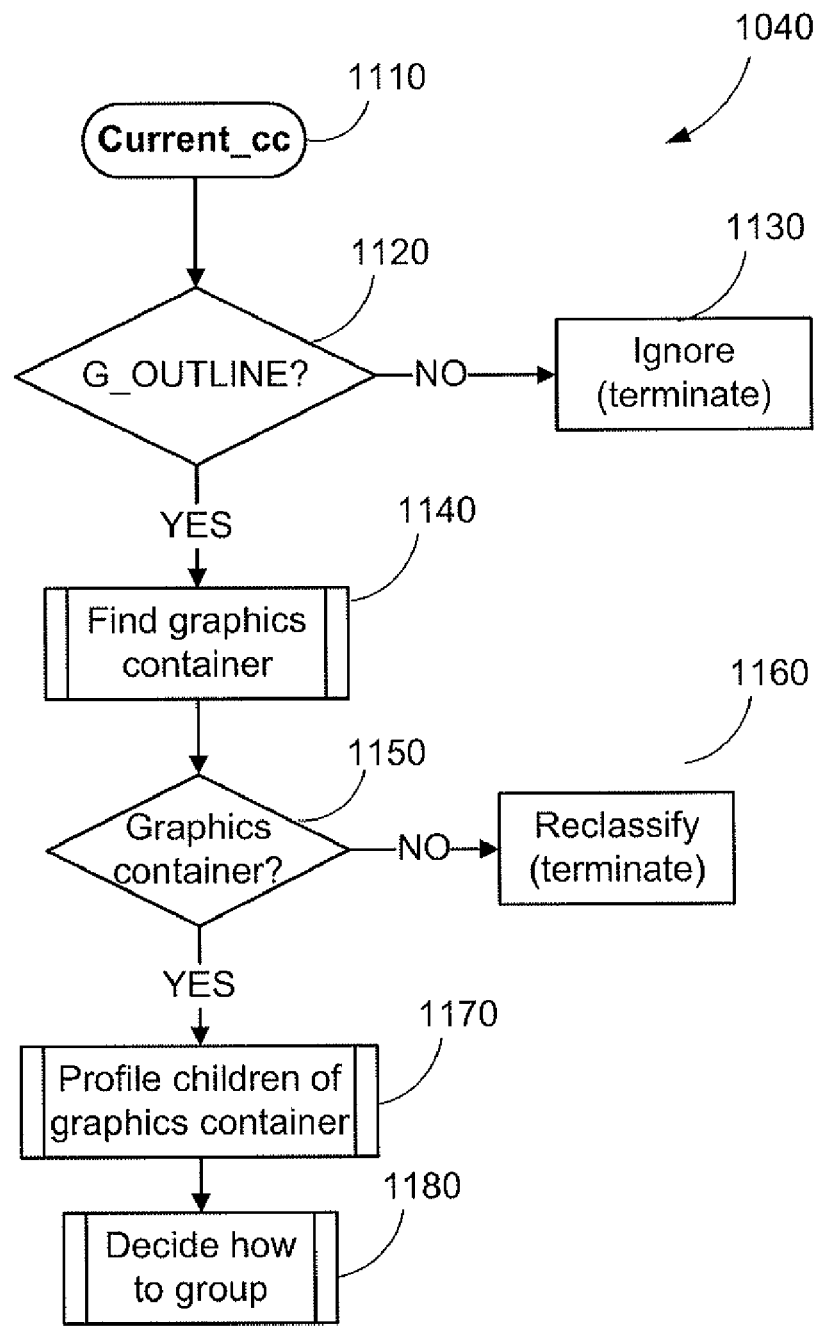
FIG. 11 is a processing flow for each CC processed by the graphics extraction process.

Graphics objects are normally made of a collection of different shapes and lines. The most salient component in a graphics object is the outline of each shape because of its unique thin and enclosing features. Those features are generally the outline which is used to define the graphics object and which is traditionally thin so that the outline doesn't impede upon any fill (which may be a bitmap). As such the outline has low pixel density. Returning to FIG. 4, an example of a graphics object is shown which consists of a collection of CCs. The outline part 441 of the graphics object 440 has the most salient graphics feature. The CC with the most salient graphics feature is therefore a good starting point for locating a graphics object. FIG. 11 shows the flowchart of the per CC graphics extraction in process 1040. The process 1040 aims to find CCs with salient graphics feature and to then examine the semantic context in the neighbourhood in order to locate graphics objects.

The process 1040 operates on the CC currently being processed, named current_cc 1110. Initially step 1120 tests the current_cc 1110 and if such is not classified as G_OUTLINE, then current_cc is ignored and no graphics extraction processing is done on this CC, and the process 1040 terminates at step 1130. If current_cc is identified at step 1120 as classified as G_OUTLINE, then the current_cc 1110 is likely to be a CC with a salient graphics feature. Further checking is performed on current_cc to check whether current_cc is worth the processing time for semantic feature extraction. A CC which is worth semantic feature extraction is called a graphics container. Process 1140 performs this checking to find a graphics container from current_cc. The graphics container may be current_cc itself, or a child CC, or a touching sibling CC. If a graphics container is not found, as tested in step 1150, then current_cc is reclassified as either NOISE or BG in step 1160, at which point the process 1040 terminates for the current_cc 1110. Step 1160 reclassifies current_cc 1110 as BG if current_cc is a good text container. Otherwise current_cc is reclassified in step 1160 as NOISE.

If a graphics container CC is found in step 1150, then the children of the graphics container CC are profiled to check for graphics characteristics by a process 1170. Data gathered from this profiling step 1170 is stored in the memory 234 and used in a following process 1180 to determine how to group the CCs in the neighbourhood of the graphics container CC into a graphics group, namely, the children of the graphics container CC and the touching sibling CCs of current_cc. If a group is created, the group is stored in the memory 234.

Figure 12:
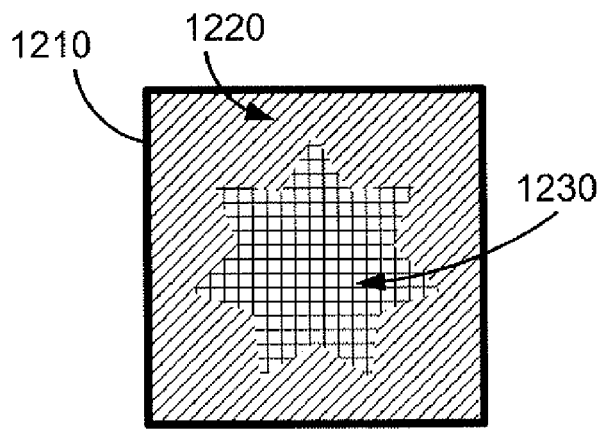
FIG. 12 is an example of a graphics object with one child CC.

FIG. 12 shows a thin frame CC 1210 which is classified as G_OUTLINE by the CC classification process 330. The frame CC 1210 includes a CC 1220 which is the interior of the frame, and is a child of the frame CC 1210. Note that the interior CC 1220 is only slightly smaller than the frame CC 1210. The interior CC 1220 has one child, CC 1230, having the shape of a star.

Figure 13:
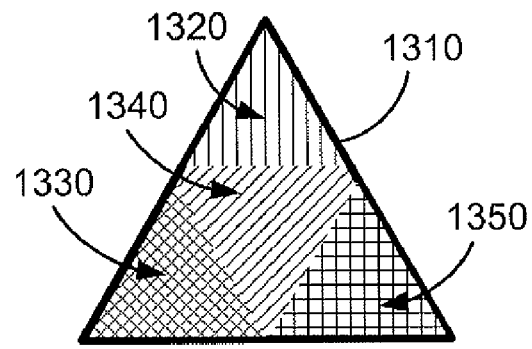
FIG. 13 is an example of a graphics object with multiple child CCs.

FIG. 13 shows a thin frame CC 1310 which is classified as G_OUTLINE by the CC classification process 330. The frame CC 1310 contains multiple child CCs 1320, 1330, 1340 and 1350. Note that none of these CCs are of similar size to the frame CC 1310.

Figure 14:
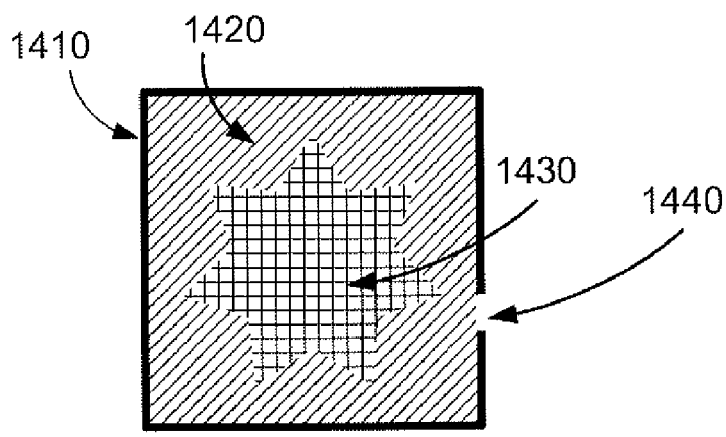
FIG. 14 is an example of a graphics object with no child CCs and one touching CC.

FIG. 14 shows a thin frame CC 1410 which is classified as G_OUTLINE by the CC classification process 330. The frame CC 1410 contains no children due to a broken right side 1440 of the frame. However the frame CC 1410 touches a CC 1420 which has a child CC 1430.

Figure 15:
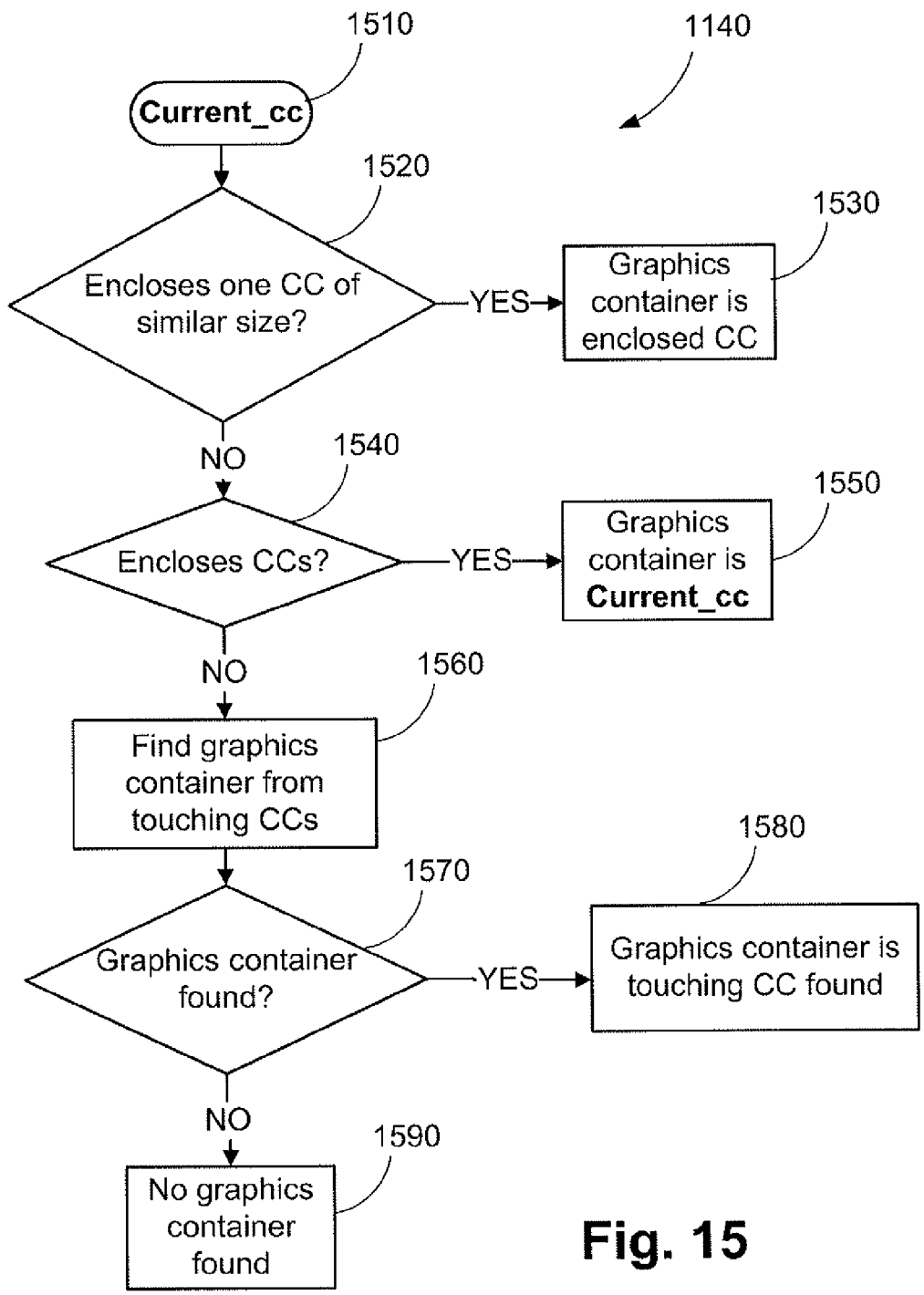
FIG. 15 is a processing flow to find the graphics container CC for graphics processing.

FIG. 15 shows the flowchart of the process 1140 to find a graphics container CC. An initial step 1520 tests if the current CC current_cc 1510 has a child which has Total Pixel Count over a threshold (eg. 80% of Enclosed Pixel Count of current_cc). If so, then this child CC is assigned as the graphics container CC in step 1530, and the process 1140 terminates or otherwise returns. For example, this is the case if the CC being processed is a thin frame, making the graphics container CC the interior of the frame. An example of this is shown in FIG. 12. If current_cc 1510 has a number of children as determined in step 1540, but none with Total Pixel Count over a threshold (eg. 80% of Enclosed Pixel Count of current_cc), then the current_cc 1510 itself is identified as the graphics container in step 1550. An example of this is shown in FIG. 13. Otherwise touching sibling CCs are checked at step 1570 to find a suitable graphics container CC at step 1580. A suitable graphics container is a CC which is classified as BG or G_FILL, has Total Pixel Count over a threshold (eg. 90% of the Bounding Box Area of current_cc) and has a Bounding Box which is within current_cc's Bounding Box. For example this is the case when there is a thin frame which is broken. The broken frame does not contain the frame interior, but touches it. An example of this is shown in FIG. 14. If no good touching sibling CC can be found to be a graphics container, then no graphics container CC has been found, as seen at step 1590.

Figure 16:
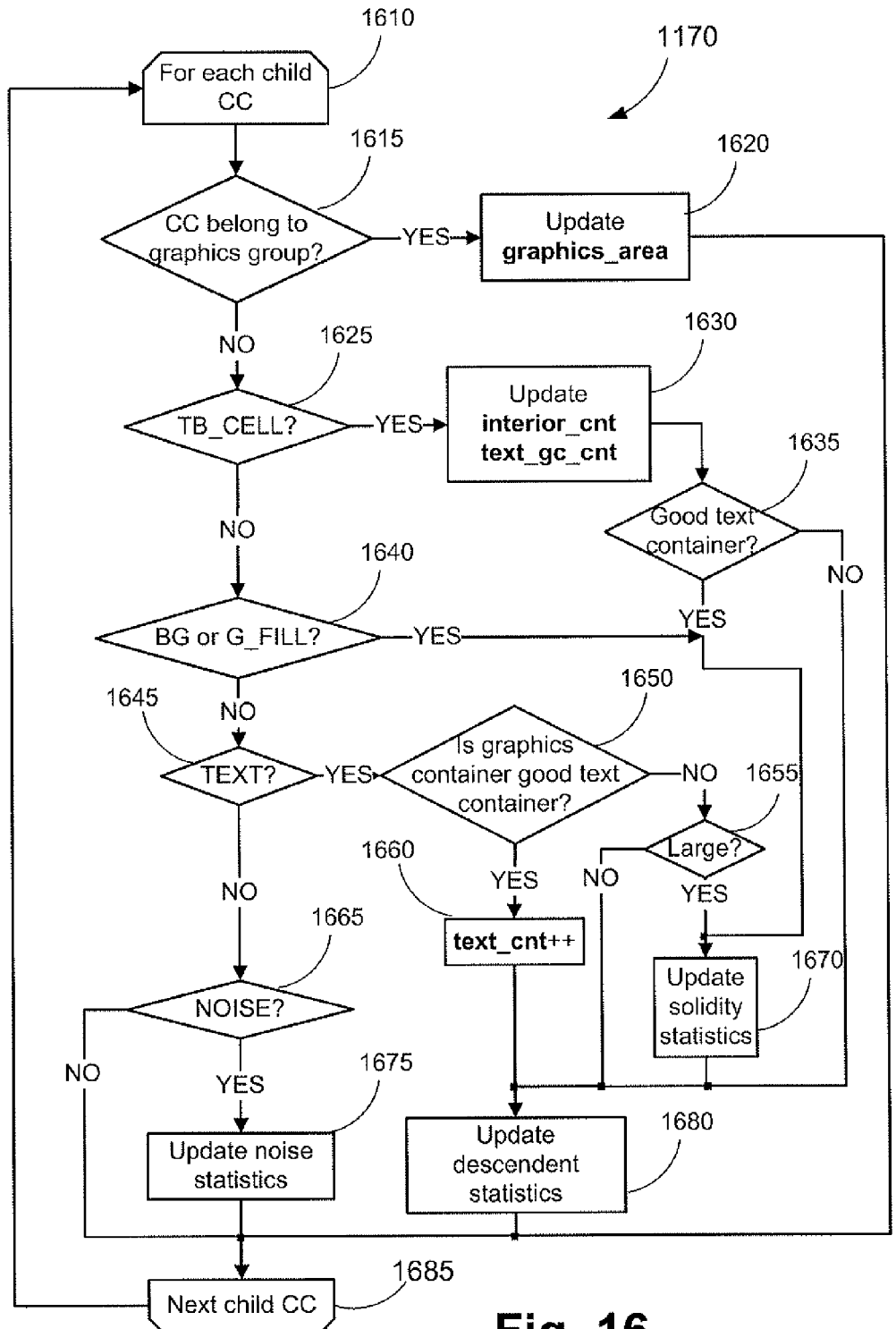
FIG. 16 is a processing flow to find the statistics of children of the graphics container CC.

FIG. 16 shows the flowchart for the process 1170, mentioned above, for profiling the children of the graphics container CC. The profiling is to extract features from the children of the graphics container CC in order to obtain semantic context. The features can be categorised into the following:

| Features | Statistics | Definitions |
|---|---|---|
| Graphics area | graphics_area | The number of pixels belong to a graphics object |
| Text | text_cnt | The number of TEXT child CCs |
| | text_gc_cnt | The number of TEXT grandchild CCs |
| Noise | noise_cnt | The number of NOISE CCs |
| | noise_pix | The sum of Total Pixel Count of NOISE CCs |
| Solidity | solidity_cnt | The number of solid like CCs |
| | solidity_pix | The sum of Total Pixel Count of solid like CCs |
| Descendant | descendant_cnt | The sum of Descendent Count of all child CCs |
| | descendant_pix | The sum of Enclosed Pixel Count of all child CCs |
| Graphics interior | interior_cnt | The number of graphics interior CCs |

The above statistics are initialised to zero before the profiling. The process 1170 operates in a loop 1610 where each child CC of the graphics container CC is checked for certain properties and statistics which are updated and stored in the memory 234. If the child CC belongs to a graphics group, as tested in step 1615, then the graphics area statistics are updated in step 1620 and the process 1170 continues to next child CC, obtained in step 1685. If the child CC is classified as TB_CELL, as tested at step 1625, then interior_cnt and text_gc_cnt are updated in step 1630. TB_CELL classified CCs are likely to be CCs directly enclosed by an outline of a graphics object and may contain text. After step 1630, the TB_CELL classified child CC is checked in step 1635 to determine whether it is a good text container. If the test in step 1635 is true, the solidity statistics are updated in step 1670. If the child CC is classified as BG or G_FILL as determined in step 1640, then the solidity statistics are also updated in step 1670. If the child CC is classified as TEXT, as determined in step 1645, then the graphics container CC is checked in step 1650 as to whether it is a good text container. If the test in step 1650 is true, text_cnt is updated in step 1660. Otherwise the TEXT classified CC is checked whether it is large (eg. Self Pixel Count >500) in decision step 1655. If it is large, the solidity statistics are updated in step 1670. Otherwise the process flow continues to step 1680 to update the descendant statistics. If the child CC is classified as NOISE, as determined at step 1665, the noise statistics are updated in step 1675 and the flow continues to the next child CC at step 1685. After all the child CCs are profiled and their statistics tabulated in the memory 234, obj_cnt is calculated by subtracting noise_cnt from Number of Enclosed of the graphics container CC. obj_cnt indicates the number of child CCs that are useful for semantic context analysis. These values may then also be stored in the memory 234.

The features obtained from process 1170 are analysed to decide whether the graphics container CC indeed belongs to a graphics object. There are three outcomes:

(i) The graphics container CC contains graphics elements only and therefore all the descendent CCs are to be grouped into a graphics group.

(ii) The graphics container CC contains graphics elements and potential text as well. The descendent CCs are selectively grouped into a graphics group to exclude the potential text.

(iii) The semantic features show that the graphics container CC does not belong to a graphics object and it is ignored.

Figure 17:
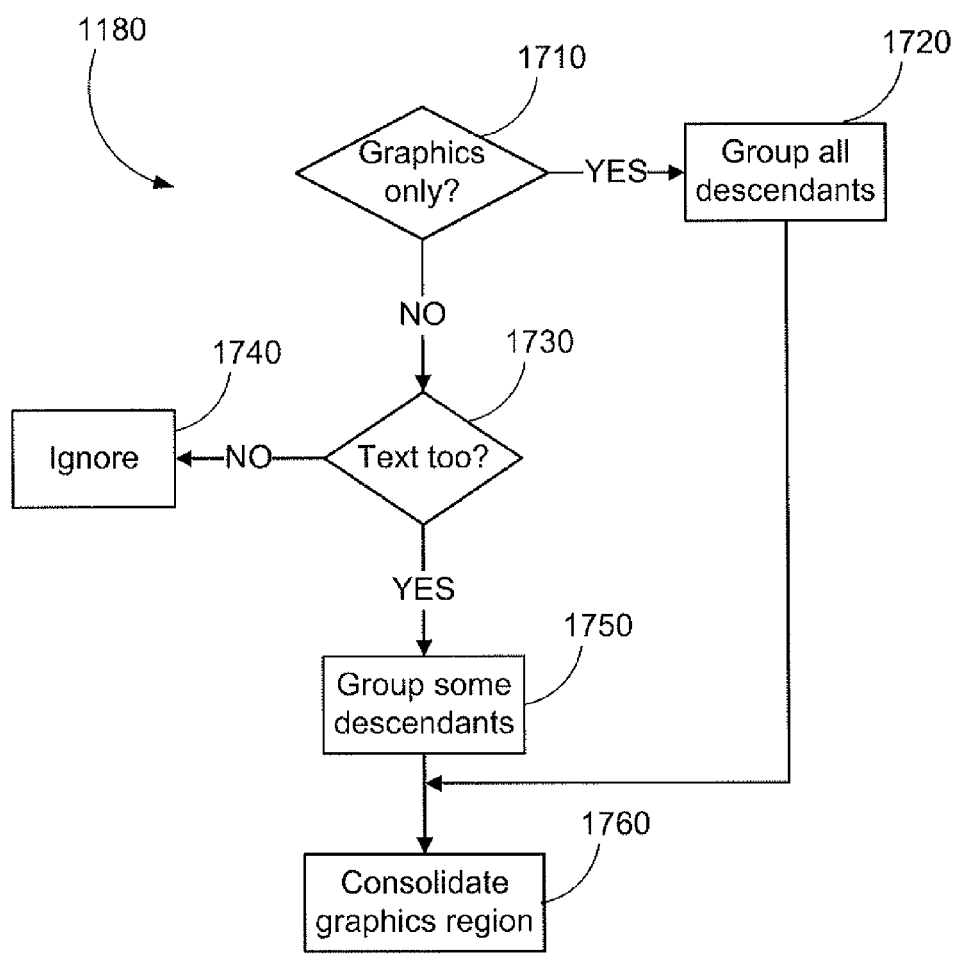
FIG. 17 is a processing flow of the graphics grouping process.

FIG. 17 shows the flowchart for the process 1180, discussed above, of deciding whether the graphics container CC belongs to a graphics object and how the neighbourhood CCs are grouped together. Step 1710 initially checks whether the graphics container CC only contains graphics elements. The check returns true if any of the following three conditions (each having multiple sub-conditions) are met:

A. (i) current_cc is not a good text container; and
(ii) graphics_area is greater than 50% of Bounding Box Area of current_cc; and
(iii) text_gc_cnt equals zero.
OR:
B. (i) The graphics container CC is classified as G_OUTLINE; and
(ii) obj_cnt equals solid_cnt plus text_cnt; and
(iii) descendant_cnt equals zero.
OR:
C. (i) The graphics container CC is classified as G_OUTLINE; and
(ii) interior_cnt is greater than 50% of obj_cnt; and
(iii) solid_pix is greater than 90% Enclosed Pixel Count of the graphics container CC; and
(iv) descendant_pix is less than noise_pix.

If any of the above conditions are met then the graphics container and all descendants of the graphics container CC are grouped into a graphics group in step 1720. In addition, if the graphics container is not current_cc, then current_cc is also added to the graphics group.

If the test of step 1710 returns false, then a test is performed in step 1730 to determine whether the graphics container CC contains graphics elements and potential text as well, based on the following conditions:

(i) The Bounding Box Area of current_cc is less than a threshold compared to the page size (for example 12.5%); and
(ii) solid_pix is more than 25% of Total Pixel Count for the graphics container CC; and
(iii) Number of Enclosed of the graphics container CC is less than a threshold (eg. 100).

If the above conditions are true, the children are selectively grouped into a graphics group together with the graphics container CC and current_cc in step 1750. Otherwise current_cc is ignored at step 1740 and no graphics grouping is performed, at which point the process 1180 returns. Step 1750 selectively groups each child CC of the graphics container CC into a graphics group if any of these conditions are true:

(i) The child CC is classified as G_FILL or G_OUTLINE; or
(ii) The child CC is classified as TB_CELL or BG and its Number of Enclosed is less than a threshold (eg. 50); or
(iii) The child CC is classified as TEXT and the graphics container CC is not a good text container and:
(iii-i) the child CC is solid (eg. Coverage >90%); or
(iii-ii) the child CC has low text confidence (eg. using machine learning for TEXT classification).

To consolidate the graphics region, after step 1720 and step 1750, the child CCs enclosed by current_cc and the touching sibling CCs of current_cc are further examined in step 1760 to check whether they should be grouped into the graphics group to complete a graphics region. Step 1760 traverses the subtree of each child CC of current_cc. The descendant CC is grouped into the graphics group if either of the following two conditions are true:

(i) The descendant CC is classified as G_FILL or TB_CELL; or
(ii) The descendant CC has already been grouped into a different graphics group.

Step 1760 groups in the touching sibling CC if either of the following conditions are true:

(i) The touching sibling CC is classified as G_FILL or G_OUTLINE; or (ii) The touching sibling CC is classified as BG or TB_CELL and its Bounding Box is fully contained within the graphics group's Bounding Box.

Figure 18:
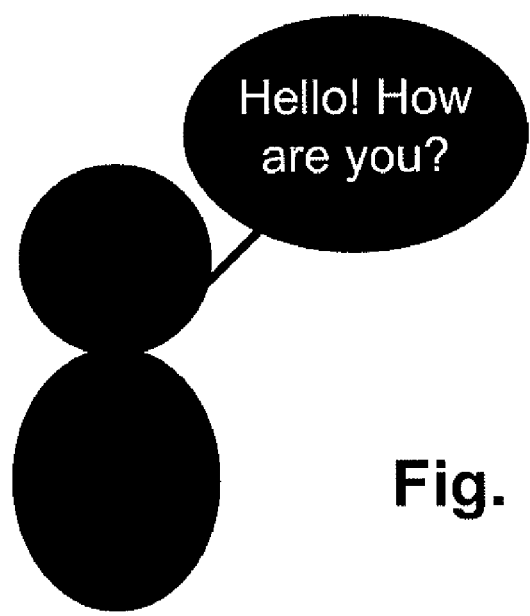
FIG. 18 is an example of the extracted graphics region from the snowman graphics in FIG. 4.

FIG. 18 shows an example of the extracted graphics region from the snowman graphics in FIG. 4. The black part is the extracted graphics region. The graphics container CC 441 is determined to contain graphics elements and potential text by step 1730 and TEXT CCs are therefore left out by step 1750. The net effect of step 1180 is to decide whether the graphics container contains a whole or part of a graphics object based on the semantic context statistics.

Photo Extraction

Figure 19:
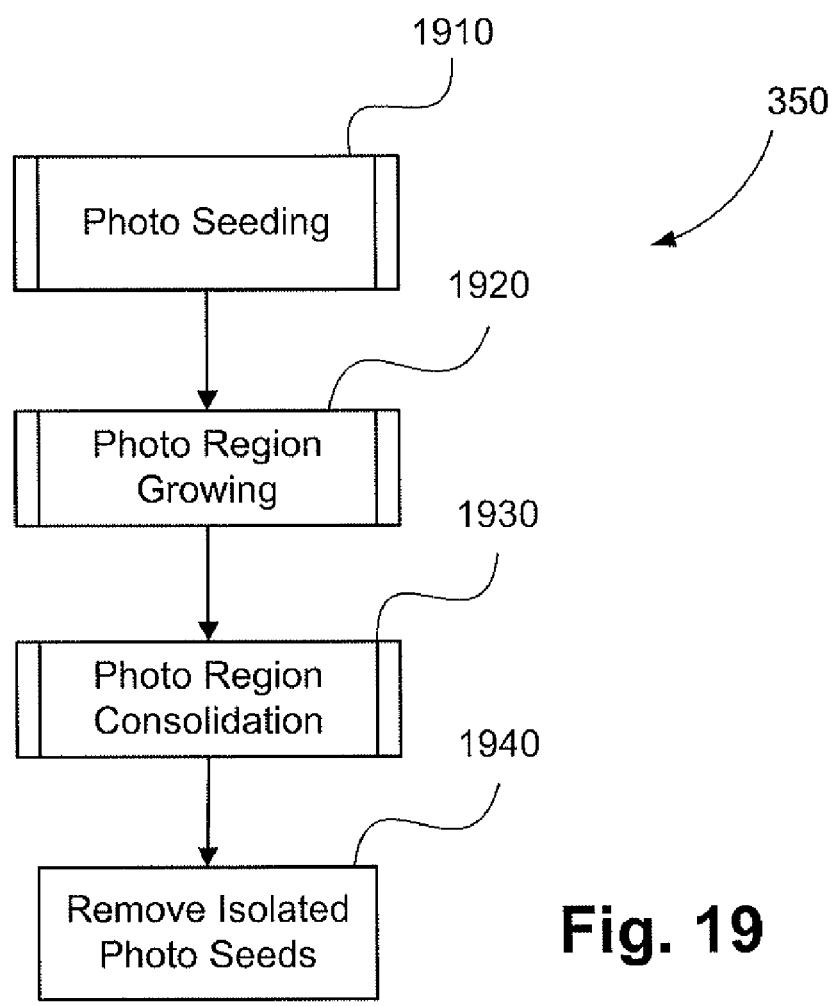
FIG. 19 is the processing flow of the photo object extraction process in FIG. 3.

FIG. 19 shows the flowchart of the photo extraction process 350 which is broken into four linearly configured stages—photo seeding 1910, photo region growing 1920, photo region consolidation 1930, and erroneous photo seed removal 1940. The photo seeding stage 1910 finds the CCs with rich photo features from the CC enclosure tree and designates those CCs as photo seeds based on contextual information from the neighbourhood of surrounding CCs. The photo region growing stage 1920 selectively groups CCs in the neighbourhood of each of the photo seeds into a photo group in order to grow photo regions from the photo seeds. A photo group is a photo region isolated from the background and representing a logical photo object in the original document. A photo group is formed using a list of PHOTO CCs. Following the photo region growing process 1920 is the photo region consolidation process 1930 which consolidates nearby photo groups and non-text CCs. All ungrouped photo seeds after the photo region consolidation process are removed from photo extraction by the process 1940. Each of these processing stages will be explained in further detail with reference to FIG. 20 to FIG. 22.

Figure 20:
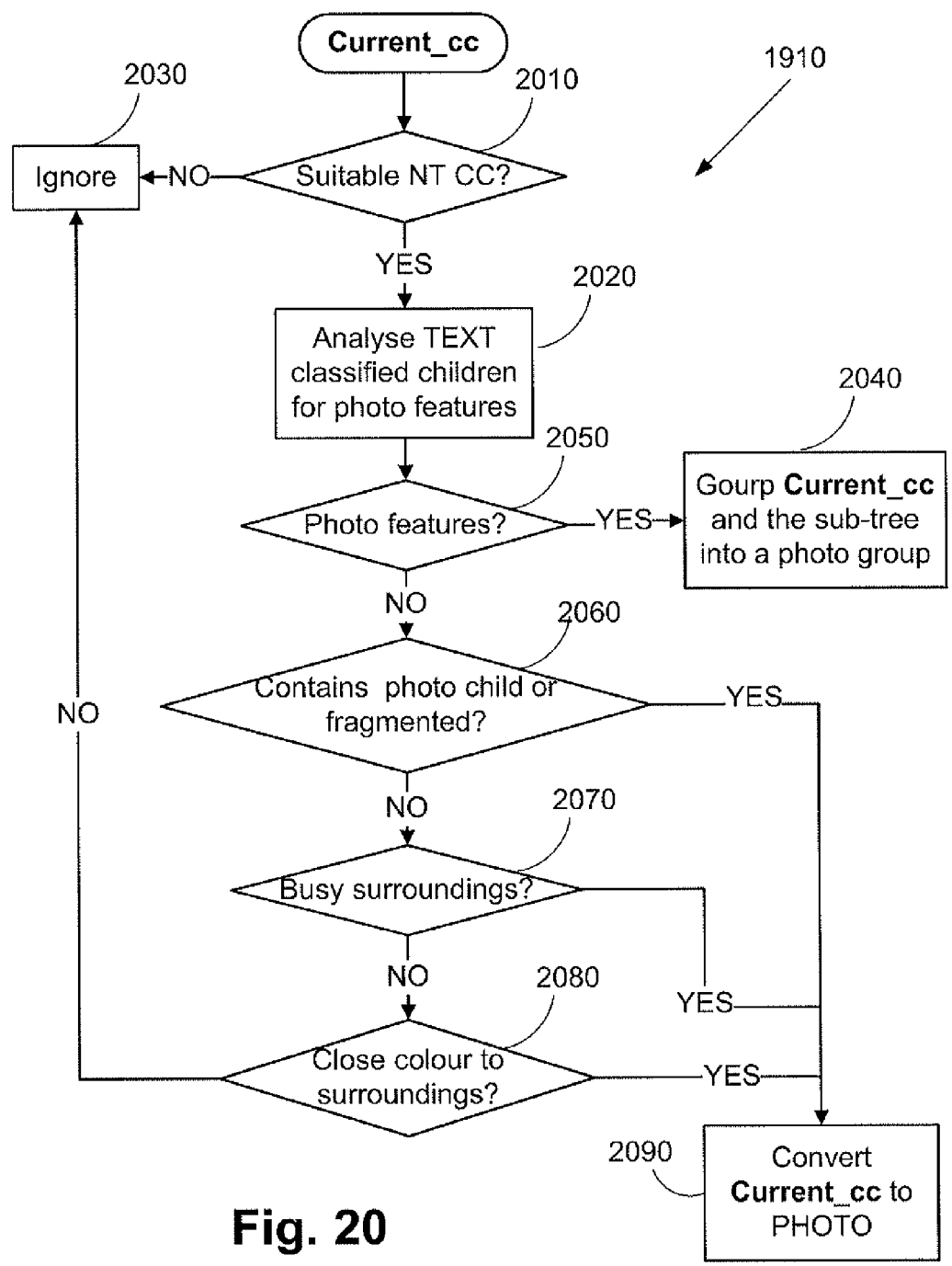
FIG. 20 is a flowchart of the photo seeding process in FIG. 19.

FIG. 20 shows the flowchart of the photo seeding process 1910. For photo seeding, the CC tree 600 is traversed in bottom up, children first order and each CC is processed for photo seeding. The tree traversing order is the same as used for the graphics extraction process 340 as shown in FIG. 10, where the process 1040 is replaced by the photo seeding process 1910. The process 1910 examines each CC (current_cc) for photo rich features.

As seen in FIG. 20, initially the current_cc is checked for suitability in step 2010. A suitable CC for photo feature analysis is a CC that satisfies the following two conditions:

(i) The CC is a non-text; and (ii) The sub-tree depth is less than 5. (CCs with sub-tree depth higher than 4 have compound features.)

If current_cc is not suitable for photo feature analysis, current_cc is ignored at step 2030, at which point the next CC in the traversal can be considered. Otherwise the flow proceeds to step 2020 to analyse TEXT classified children of the current_cc. The fine details of a photo often have text characteristics at CC level because they are normally segmented to text-sized CCs. These text-sized CCs are often classified as TEXT. However when these TEXT classified CCs are considered together, they have different characteristics from a group of real text CCs as normally found in a text paragraph. Step 2050 then determines whether the current_cc has photo features when any of the following conditions A-E is met:

A. (i) The number of all the TEXT classified children is greater than a threshold (eg. 10); and (ii) The mean of Self Pixel Count of all the TEXT children is smaller than a threshold (eg. 15).

OR:

B. (i) The number of TEXT classified children is greater than a threshold (eg. 10); and (ii) The mean of Self Pixel Count of all the TEXT children is smaller than a threshold (eg. 40); and (iii) The average bin contains higher than 50% of all the TEXT classified children; and (iv) The medium bin contains higher than 70% of all the TEXT classified children.

OR:

C. (i) The number of TEXT classified children is greater than a threshold (eg. 10); and (ii) The mean of Self Pixel Count of all the TEXT classified children is smaller than a threshold (eg. 40); and (iii) The average bin contains higher than 20% of all the TEXT classified children; and (iv) The small bin contains more than the average bin.

OR:

D. The number of TEXT classified children is greater than a threshold (eg. 10); and (ii) The high bin contains higher than 40% of all the TEXT classified children; and (iii) The small bin contains higher than 40% of all the TEXT classified children.

OR:

E. (i) The total Self Pixel Count of all the TEXT children is greater than $1/16$ of Total Pixel Count of current_cc; and (ii) The Total Pixel Count of current_cc is less than $2/3$ of the Bounding Box Area of current_cc; and (iii) The variance of Self Pixel Count of all the TEXT children is greater than a threshold (eg. mean*mean*10).

If there are photo features found, the current_cc and the sub-tree of current_cc are grouped into a photo group. All CCs in the photo group are reassigned with the PHOTO classification. When there are no photo features found in current_cc, the flow proceeds to step 2060 which checks whether current_cc contains any PHOTO child or is fragmented relative to the Bounding Box Area of current_cc (eg. Pixel Run Count is greater than 3% of Bounding Box Area of current_cc). If the test in step 2060 is false, the flow proceeds to step 2070 which checks whether current_cc has busy surroundings. Current cc has busy surroundings if the following conditions are met:

(i) Number of Touching is greater than 100; and (ii) Number of Touching is greater than 1% of Self pixel Count.

If the test in step 2070 is false, the flow proceeds to step 2080 which checks whether current_cc is in a colour difference range to any of its touching siblings. Photo regions often have shades of the same hue. The colour difference range is set to find colours that are visually different, but not too different. A colour distance function with a predetermined threshold is used to discriminate visually different colours. Given two input colours, the colour distance function returns a number describing their similarity. In a preferred implementation, this is calculated as the Manhattan distance between the colours in YCbCr colours space, scaled by the difference in hue and saturation. To avoid converting large background area to a PHOTO CC, the touching siblings are limited to CCs with Bounding Box Area less than $1/16$ of the page size and CCs that are not good text containers. If the test in step 2080 is false, the current_cc is ignored in step 2030. If current_cc is determined to be photo-like in steps 2060, 2070 or 2080, then current_cc is converted to PHOTO in step 2090. The photo seeding process in FIG. 20 is performed on each CC in the enclosure tree 600 in the order demonstrated in FIG. 10 until all the CCs are processed.

After the photo seeding process 1910, all CCs with high probability as part of a photo object are converted to PHOTO. The CCs in the neighbourhood of each of the photo seeds will be examined for photo region growing from the photo seed.

Figure 21:
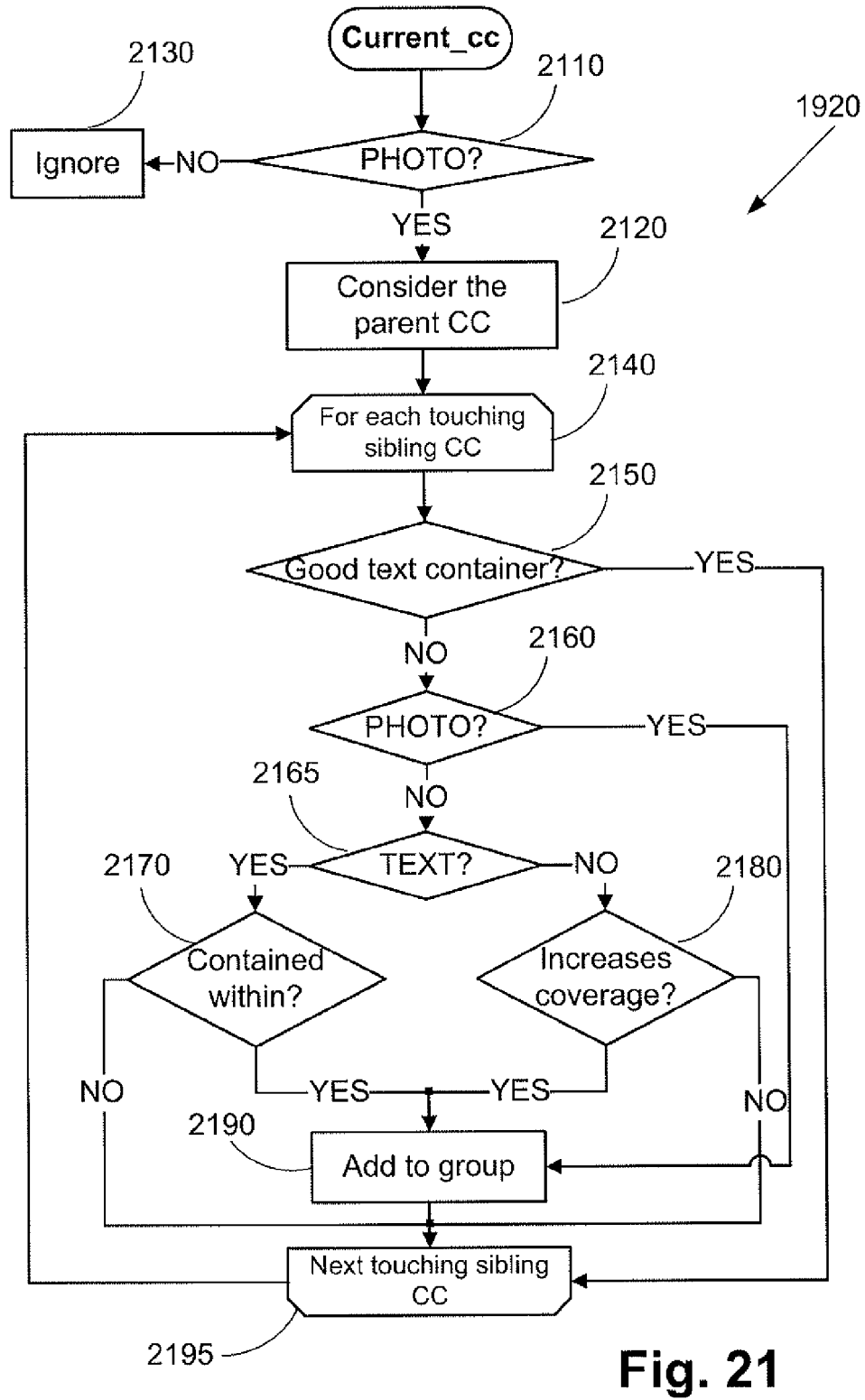
FIG. 21 is a flowchart of the photo region growing process in FIG. 19.

The neighbourhood of a PHOTO CC includes the touching siblings and the parent CC. FIG. 21 shows a flowchart of the photo region growing process 1920 for each photo seed on the touching sibling CCs and the parent CC. In a preferred implementation, the CC tree 600 is again traversed in bottom up, children first order and each CC is processed for photo region growing. Where appropriate or desirable, other approaches to accessing the CCs may be used in alternate implementations. Referring to the bottom up tree traversing flow in FIG. 10, the process 1040 is replaced by process 1920 which processes current_cc.

In an initial step 2110 of the process 1920, if current_cc is not classified as PHOTO, the CC is ignored at step 2130 and processing proceeds to the next CC. If current_cc is classified as PHOTO at step 2110, its parent CC is checked in step 2120 for photo region growing. The photo region is expanded into the parent if all of the following conditions are met:

(i) The parent CC is classified as PHOTO or G_OUTLINE; and (ii) The Total Pixel Count of the parent CC is less than ¼ of the page size; and (iii) The parent CC does not touch any FRAME or G_OUTLINE classified CCs; and (iv) The parent CC is not a good text container or the Self Pixel Count of the parent CC is less than the Total Pixel Count of current_cc.

After the parent CC is examined for photo region growing, the processing proceeds to step 2140 wherein each of the touching siblings of current_cc is examined for photo region growing. If the touching sibling CC is a good text container, as determined at step 2150, the touching sibling CC is excluded from photo region growing and the processing moves on to step 2195 to acquire the next touching sibling CC, which is then processed at step 2140. Otherwise, step 2160 then checks whether the otherwise bad text container is classified as PHOTO. If not, the touching sibling CC is checked whether it is classified as TEXT at step 2165. The TEXT classified touching sibling CC is then checked at step 2170 to determine whether it is fully contained within the bounding box area of the expanded photo region of current_cc. A TEXT classified CC, touching a PHOTO CC but not enclosed by the PHOTO CC, has high probability of being a falsely classified text character and therefore should be added to the touching photo group. The non TEXT classified touching sibling CC is checked at step 2180 to assess whether it increases the coverage of the expanded photo region of current_cc. Coverage is defined as the total number of pixels contributing to the region divided by the bounding box of the region. If the coverage of the combined region is greater than either the Coverage of the touching sibling CC or the coverage of the expanded photo region of current_cc, the touching sibling CC is determined to be part of the logical photo object. When the touching sibling CC, either TEXT or non-text, is determined to be part of the touching photo object, it is added by way of step 2190 to the photo group to which current_cc belongs.

After the photo region growing process 1920, each isolated photo object on the page should have been formed into a photo group. Because the photo region growing process 1920 is based on touching siblings and enclosing parents, a logical photo object in the original document may have been split into more than one photo group due to imperfect colour quantisation and CC segmentation.

Figure 22:
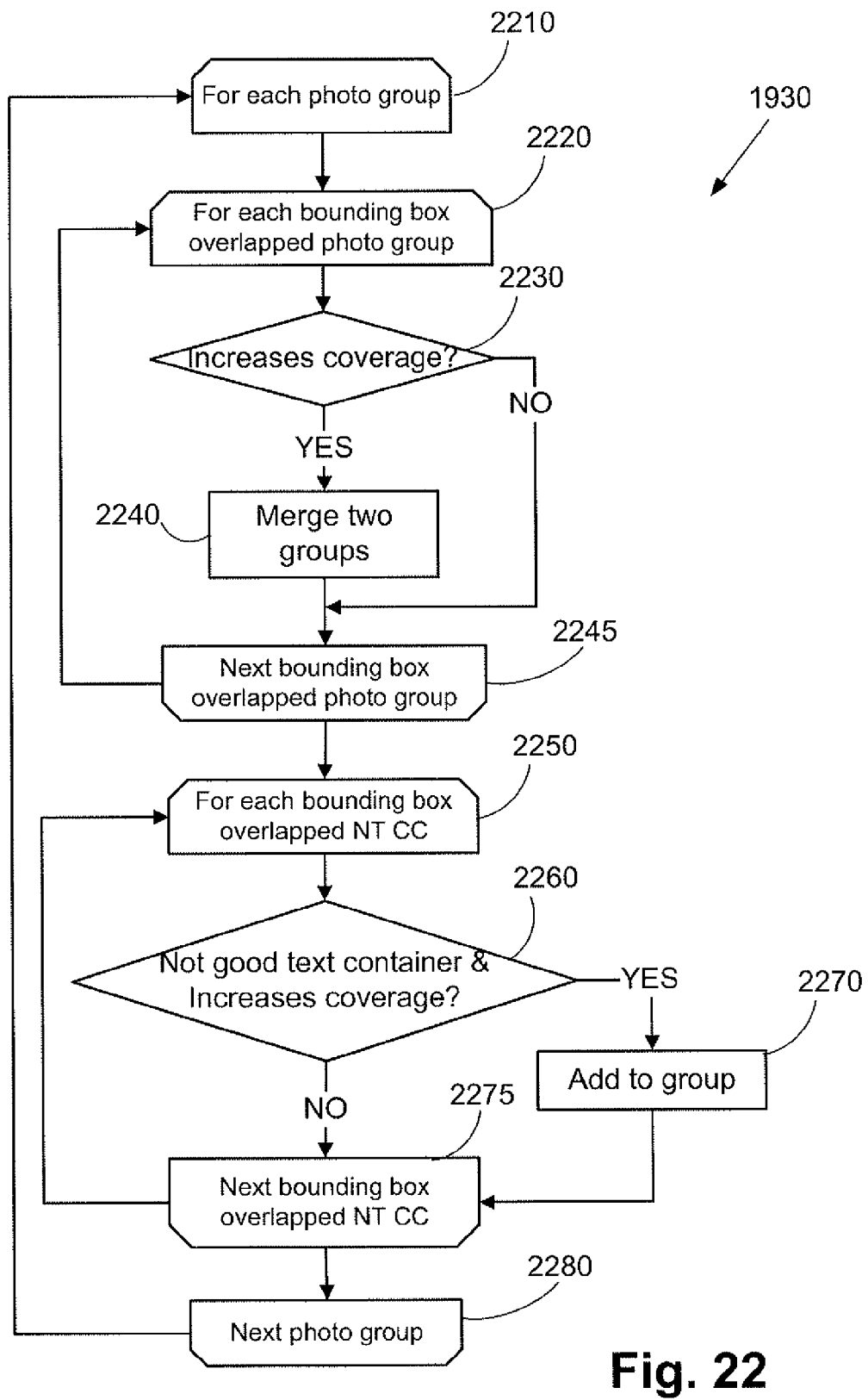
FIG. 22 is a flowchart of the photo region consolidation process in FIG. 19.

The photo region consolidation process 1930 as shown in FIG. 22 further examines the already formed photo groups and non-text CCs in order to consolidate nearby photo regions into logical photo objects. The photo region consolidation process 1930 loops through each photo group at step 2210 and considers all good candidates. Good candidates include all the other photo groups that have a bounding box that overlaps with the current photo group, as assessed at step 2220, and all non-text CCs that have bounding box overlaps with the current photo group, as assessed at step 2250. For an overlapped photo group, identified at step 2220, the merging condition assessed at step 2230 is whether the coverage of the two merged photo groups is higher than the coverage of either of the two photo groups. If the test in step 2230 is true, the overlapped photo group is merged to the current photo group at step 2240 and all the statistics associated are updated accordingly. The process repeats via step 2245, which identifies the next bounding box overlapped photo group, until all overlapped photo groups are considered. Next the overlapped non-text CCs are considered in a loop commencing at step 2250. For a non-text CC to be determined to be part of the nearby photo group, the following conditions have to be met:

(i) The non-text CC is not a good text container; and (ii) The merging can produce coverage higher than either the Coverage of the non-text CC or the coverage of the photo group.

If the above conditions are met, as assessed in step 2260, the non-text CC is added into the current photo group in step 2270. The process repeats by accessing the next bounding box of the overlapped non-text CC at step 2275, by returning to step 2250 until all overlapped non-text CCs are considered. When the loops at 2220 and 2250 have completed, the next photo group is accessed at step 2280 and the process 1930 returns to step 2210.

Following the photo region consolidation process 1930, there may be still some photo seeds that are not grouped into any of the photo groups. It is unlikely that a logical photo object only consists of a CC. To avoid false photo extraction, all ungrouped photo seeds are changed to BG. As a result, the photo region growing and photo region consolidation processes 1920 and 1930 also serve as a confirmation step for the photo seeding process.

Text Extraction

Figure 23:
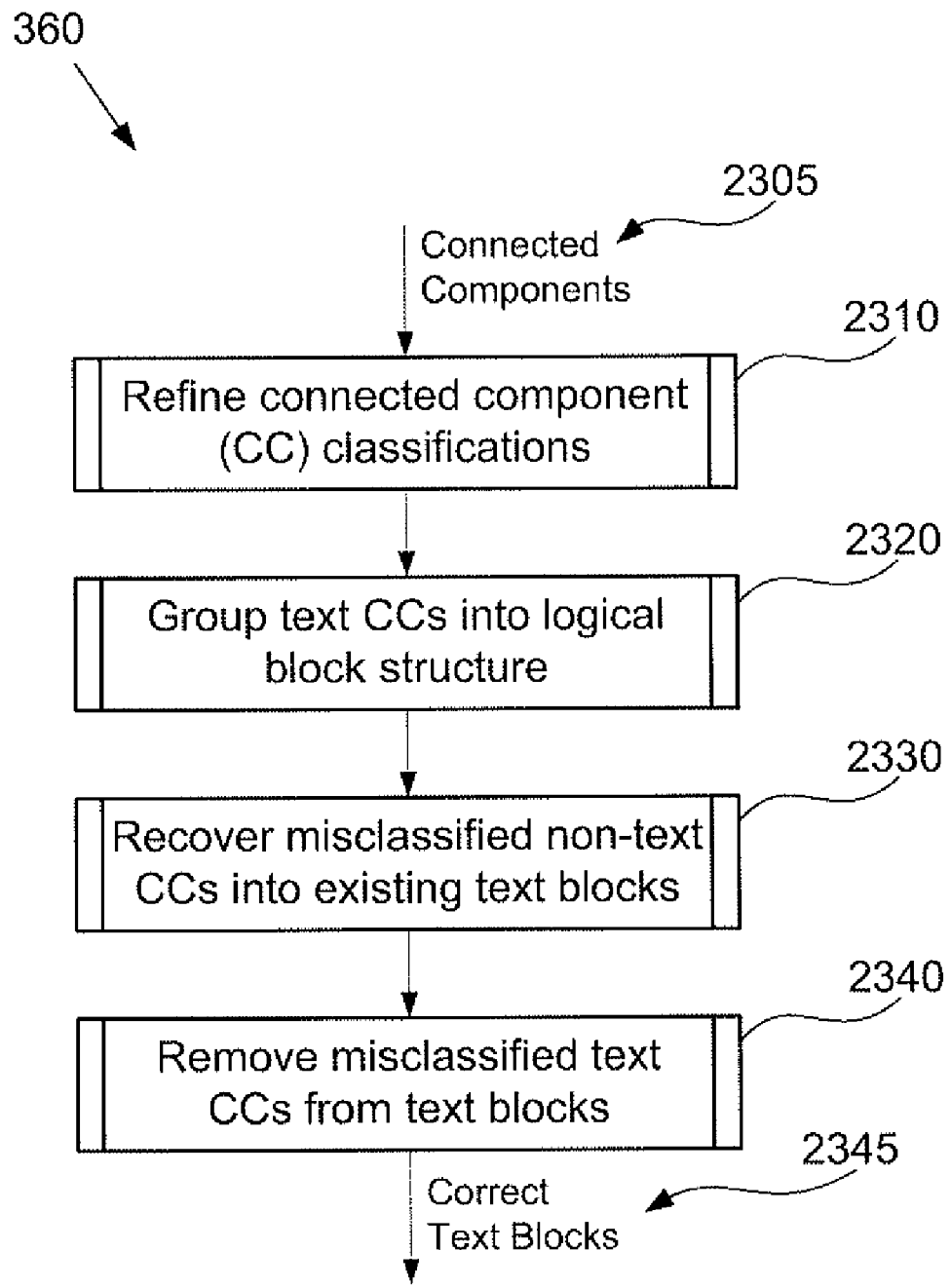
FIG. 23 is a flowchart of the text extraction process.

FIG. 23 shows the flowchart of the text extraction process 360, which groups CCs of text characteristics (TEXT CCs) to form logical text blocks such as text lines and paragraphs. The text blocks can then be extracted for applications such as OCR.

The TEXT CC grouping process 360 normally employs a nearest-neighbour-search technique to find suitable candidates in the proximity for each TEXT CC. A grouping decision for each TEXT CC is then made based on its distance to all candidates. Typically there are a lot more TEXT CCs in a colour compound document image with mixed contents than in a black and white document image. The increase in the number of TEXT CCs is caused by the increase of image reproduction artefacts aforementioned in the background art. These artefacts are often of text size and as a result they are classified as TEXT.

Performing text grouping directly with a significant number of misclassified TEXT CCs is not only time consuming but also affects the accuracy of the logical text blocks. In a preferred implementation as seen in FIG. 23, connected components 2305 are input and the TEXT CC classification is initially refined in step 2310 to reduce misclassification based on the statistics derived from the global colour context information. The refined TEXT CCs are then grouped into logical text blocks by a process 2320. Documents with mixed-contents may have text regions that overlap with non-text regions. The actual text CCs in the overlapped portion may have been misclassified as non-text CCs by the CC classification, graphics or photo extraction processes. The text blocks formed by the text grouping process can provide additional context to correct the misclassification of actual text CCs based on the text characteristics derived from a text block. The actual text CCs misclassified as non-text CCs are recovered into a nearby existing text block by a process 2330. In the preferred implementation, the TEXT CC classification refinement process takes a conservative approach to reject misclassified TEXT CCs because the global colour context information may not be able to provide enough information to make a confident decision in all situations. In such occasions the misclassified TEXT CCs will be grouped into a text block together with the actual text. A further process 2340 then extracts local colour context information from a text block so that a confident decision can be made to reject misclassified TEXT CCs from a text block, to then output 2345 correct text blocks, which may be stored in the memory 234.

Refine CC Classifications

There are known methods for text CC classification in the art. These methods normally use pixel properties extracted from CCs and classify them into TEXT or non-text. Colour information is generally not used because one cannot assume which colour is used to represent text characters. Though text characters are normally represented with darker colours compared to the surrounding background, assuming such a colour combination will inevitably miss out lighter text colours on dark background. However it is reasonable to make the assumption that text characters are of uniform colours in the majority of colour documents. Such assumption is true except for word arts which may use non uniform colours as fills such as gradation or patterns. Typically there are only a limited number of colours used to represent text in a document and text characters of the same colour are normally used to represent a word, a sentence or a paragraph. There is generally some space between text characters. Based on these facts, one can assume that a TEXT CC should not touch another TEXT CC of a different colour. When touching TEXT CCs exist, such contradicts with the facts mentioned above and causes a conflict. This conflict shows that some of these touching TEXT CCs must have been introduced as a result of imperfect segmentation caused by the aforementioned artefacts, or form part of complex background. Such misclassified TEXT CCs are preferably corrected before text grouping.

Figure 24:
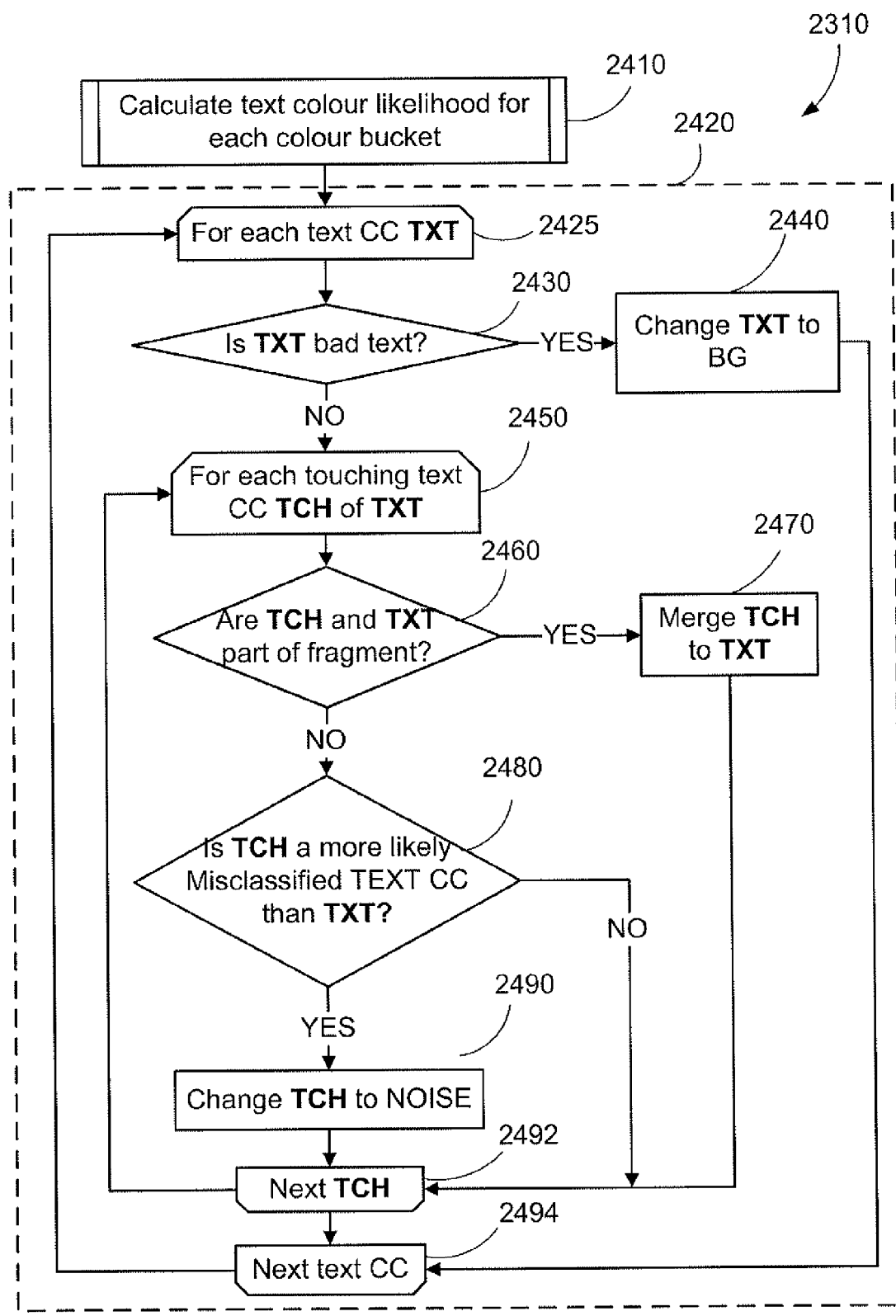
FIG. 24 is a flowchart of refining TEXT CC classification in FIG. 23.

FIG. 24 is a flowchart explaining the TEXT CC classification refinement process 2310, which attempts to solve the conflict between touching TEXT CCs. The conflict resolution is determined based on which of the touching TEXT CCs is less likely to be the real text. The likelihood of being a real text character is decided by the global CC classification histogram of each colour present on the page. Each colour present on the page has a likelihood of being used for text representation. There are two stages to the process 2310—text colour likelihood calculation 2410 and resolving conflicts 2420.

Figure 25:
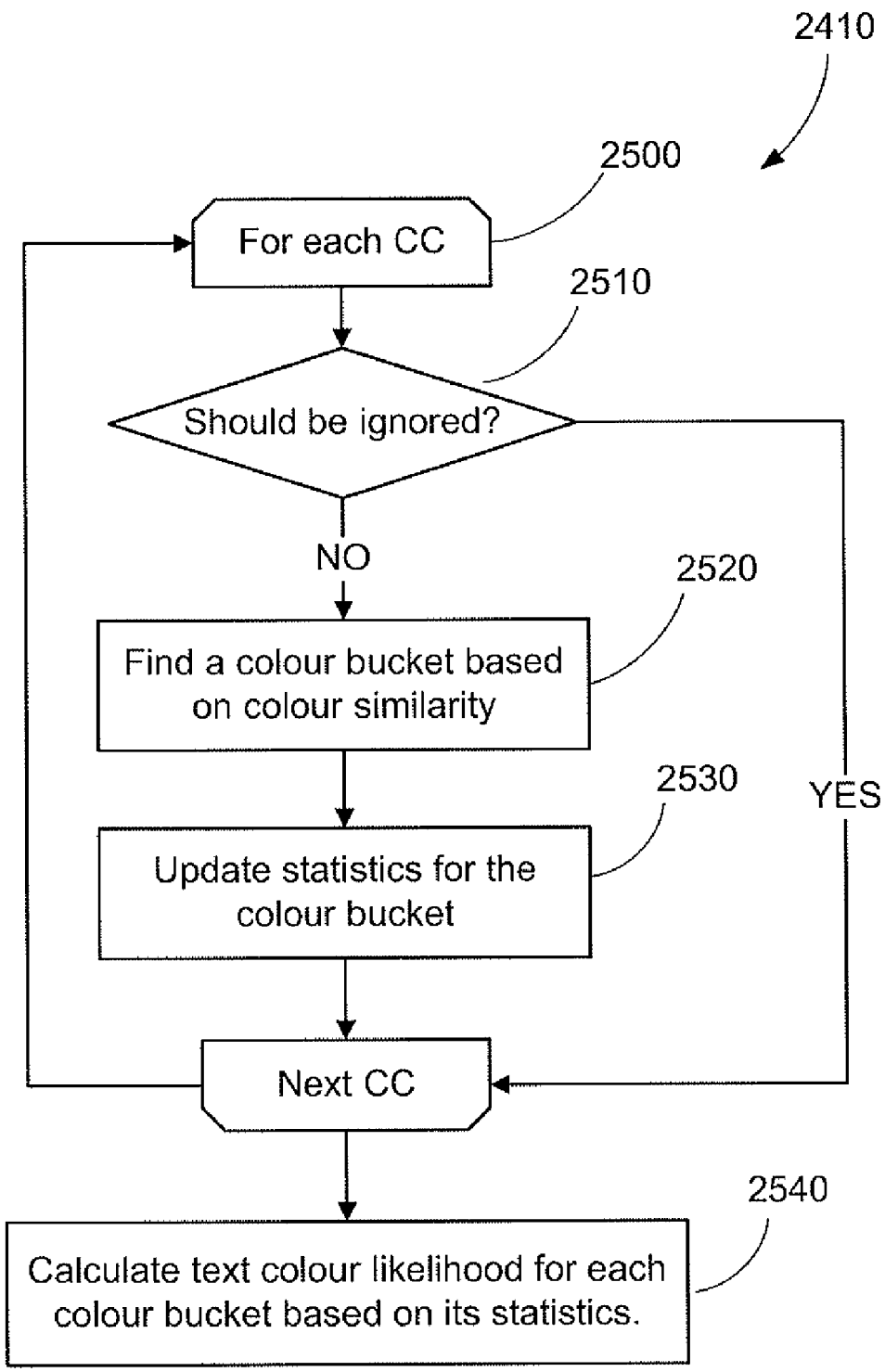
FIG. 25 is a flowchart of calculating text colour likelihood for each colour bucket in FIG. 24.

FIG. 25 explains the detail of process 2410 which profiles the CC classification results for each colour and then calculates the likelihood of being a text colour based on the statistics in each of a number of colour buckets. Due to colour fluctuations caused by printing, scanning and colour quantisation, similar colours present on the page are profiled into the same colour bucket. A loop is established at step 2500 such that the process 2410 selectively places CCs on the page into a colour bucket while accumulating CC classification statistics. Since the CC classification profiling for a specific colour is to determine its likelihood of being a text colour, it is important to exclude some CCs from the profiling so that a more accurate likelihood estimation for a colour can be obtained. Step 2510, being a first step in the loop, makes a decision on which CCs should be ignored. This includes CCs without a valid classification, such as those in the sub-tree of a TEXT classified CC which are not classified during the CC classification process 330. These unclassified CCs are of no importance to the text likelihood calculation and are ignored. Noise-sized TEXT CCs are also ignored so that the statistics are not polluted. TEXT CCs smaller than a certain size (eg. Self Pixel Count <15) may actually be noise and are excluded from profiling. Such noise-sized TEXT CCs are placed into a noise colour bucket without updating the bucket statistics. The bucket choice for each CC is based on colour similarity as determined in step 2520. If there is no existing colour bucket with a similar colour found, a new colour bucket is created for the CC. Each colour bucket contains the following information:

| Statistics | Definitions |
| --- | --- |
| TEXT CC Count | The number of all the TEXT classified CCs being placed in the bucket |
| Non-text CC Count | The number of all the non-text classified CCs being placed in the bucket |
| NOISE CC Count | The number of all the NOISE classified CCs being placed in the bucket |
| TEXT Pixel Count | The sum of Self Pixel Count of all the TEXT classified CCs being placed in the bucket |
| Non-text Pixel Count | The sum of Self Pixel Count of all the non-text classified CCs being placed in the bucket |
| NOISE Pixel Count | The sum of Self Pixel Count of all the NOISE classified CCs being placed in the bucket |
| TEXT CC Size Mean | The mean of Self Pixel Count of all the TEXT classified CCs being placed in the bucket |
| TEXT CC Size Variance | The variance of Self Pixel Count of all the TEXT classified CCs being placed in the bucket |
| Total CC Count | The number of all the CCs being placed in the bucket |
| Total Pixel Count | The sum of Self Pixel Count of all the CCs being placed in the bucket |

Step 2530 then updates the above statistics accordingly when a new CC is placed into the bucket. Once all the useful CCs on the page are placed into a suitable colour bucket, the likelihood of each colour bucket being a text colour is calculated in step 2540 based on the accumulated statistics. The likelihood estimation is desirably expressed as a percentage, and is based on the following pseudo code:

```
CC Weighted Likelihood = TEXT CC Count / Total CC Count * 100
Pixel Weighted Likelihood = TEXT Pixel Count / Total Pixel Count * 100
IF
    NOISE CC Count > Total CC Count * 0.95 OR
    TEXT CC Count = 0
THEN likelihood = 0
ELSE IF
    TEXT CC Count >= 3 AND
    TEXT CC Size Variance < TEXT CC Size Mean * 2 AND
    TEXT CC Count > (Total CC Count − NOISE CC Count) * 0.7 AND
    TEXT Pixel Count > Total Pixel Count * 0.7 AND
THEN likelihood = 80
ELSE IF
    TEXT CC Count >= 20 AND
    CC Weighted Likelihood > 80 AND
    Pixel Weighted Likelihood < 10
THEN likelihood = 20
ELSE IF
    TEXT CC Size Variance < TEXT CC Size Mean AND
    TEXT Pixel Count > Total Pixel Count * 0.5
THEN likelihood = CC Weighted Likelihood * 1.2
ELSE IF
    TEXT CC Size Variance < TEXT CC Size Mean * 5
THEN likelihood = CC Weighted Likelihood * 0.8
ELSE likelihood = CC Weighted Likelihood * 0.25
```

The resolving conflicts stage 2420 in FIG. 24 traverses the enclosure tree 600 and examines each TEXT classified CC TXT in a loop established at step 2425. Step 2430 rejects a TEXT classified CC as bad text if any of the following conditions is true:

TXT is in a colour bucket with zero text colour likelihood;

TXT has a PHOTO classified parent CC and TXT is in a colour bucket with low text colour likelihood (eg. <20); and the colour difference between TXT and its parent is not significant (eg. <50).

Figure 32A:
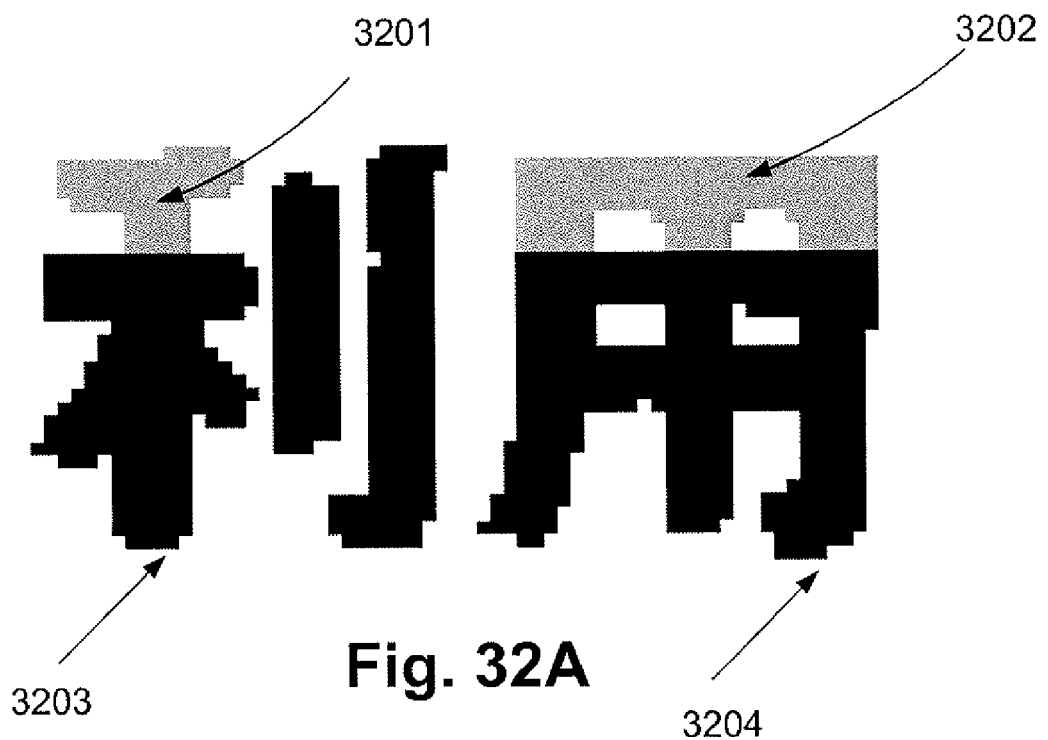
FIG. 32A-32B are examples showing fragmented TEXT CCs before and after merging.

The classification of a rejected TEXT CC is changed to BG by step 2440 and the process 2420 continues to the next TEXT CC at step 2494. Otherwise the process 2420 continues to step 2450 to find whether TXT has any conflicts with any of its touching sibling TEXT CCs (TCH). A conflict sometimes is caused by imperfect segmentation due to colour fluctuation. Such a conflict should be resolved by merging the two CCs in order to fix text character fragmentation. FIG. 32A shows two examples of text character fragmentation, where CC 3201 and CC 3203 originally belong to the same part of a text character. Imperfect segmentation causes them to become two CCs. CC 3202 and CC 3204 are another such example. Step 2460 checks whether TCH and TXT are both part of a fragmented text character using the following two conditions:

A. (i) The colour distance between TCH and TXT is not very high (eg. <80); and (ii) TCH and TXT overlap; and (iii) Both TCH and TXT have high Edge Ratio (eg. >0.7) and both are in a colour bucket with high text colour likelihood (eg. >80).

OR:

B. (i) TCH and TXT are of similar colour; and (ii) TCH and TXT do not overlap with each other.

Figure 32B:

If either of the above two conditions is met, TCH and TXT are merged together into a single TEXT CC at step 2470. FIG. 32B shows two examples of a fragmented text character being merged into a complete text character, complementing the examples of FIG. 32A. If TCH and TXT are not both part of a fragmented text character, one of them might be a misclassified TEXT CC resulted from the aforementioned artefacts. Further analysis is performed at step 2480 which checks whether TCH is more likely a misclassified TEXT CC compared to TXT. TCH in the pair is determined to be a misclassified TEXT CC if any of the following conditions is true:

(i) TCH is in a colour bucket with zero text colour likelihood;

(ii) TXT is in a colour bucket with high text colour likelihood (eg. >50), and TCH's Self Pixel Count is very small (eg. <40), and TXT's Self Pixel Count is much greater than TCH's Self Pixel Count (eg. at least four times greater);

(iii) TXT is in a colour bucket with higher TEXT CC Count and higher TEXT CC Size Mean than TCH's.

Figure 30A:
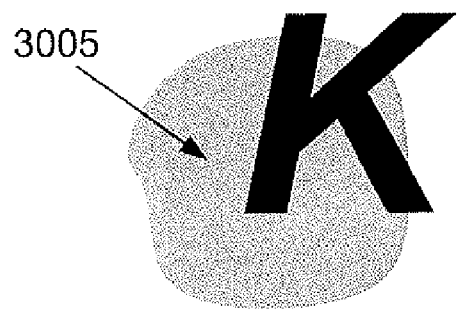
FIG. 30A-30C are examples demonstrating the TEXT CC classification refinement process.
Figure 30B:
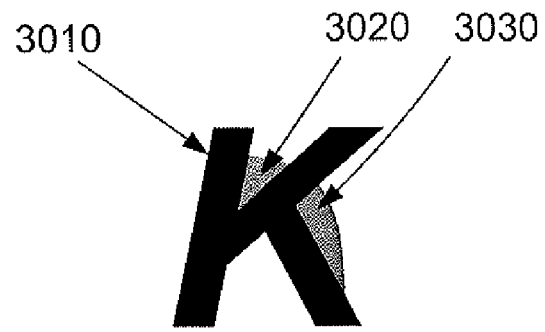
Figure 30C:
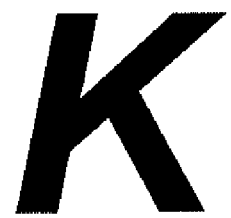

If TCH is determined to be a misclassified TEXT CC, TCH's classification is changed to NOISE at step 2490. FIG. 30A is an example of a text character 'K' on complex background. After CC classification, the letter 'K' (CC 3010) and two cut outs of the blob-shaped background 3005, CC 3020 and CC 3030, are all classified as TEXT, as seen in FIG. 30B. The misclassified TEXT CCs, 3020 and 3030, are corrected by comparing the text colour likelihood between the colour of the letter 'K' and the colour of the blob-shaped background 3005. Normally the text colour likelihood of a real text is much higher than the non-text colours, which correspondingly have a significantly lower text colour likelihood because text of a specific colour hardly exists by one TEXT CC. When step 2480 cannot make a decision, the potentially misclassified TEXT CCs remain the TEXT classification. The potential misclassifications are left to be analysed by the process 2340, discussed above, where a better local context statistics can be obtained from a text block. TEXT misclassifications resulted from the aforementioned artefacts have the same characteristics to the example in FIG. 30B except the misclassified TEXT CCs are relatively smaller than CC 3020 and CC 3030.

After step 2490, the next TCH is retrieved at step 2492 and the process 2420 returns to step 2450 as discussed above.

When all of the touching sibling TEXT CCs of TXT are analysed, process for TXT is completed. Once all TEXT CCs in the enclosure tree are analysed, the resolving conflicts stage 2420 finishes.

Group Text CCs into Logical Block Structure

Figure 26:
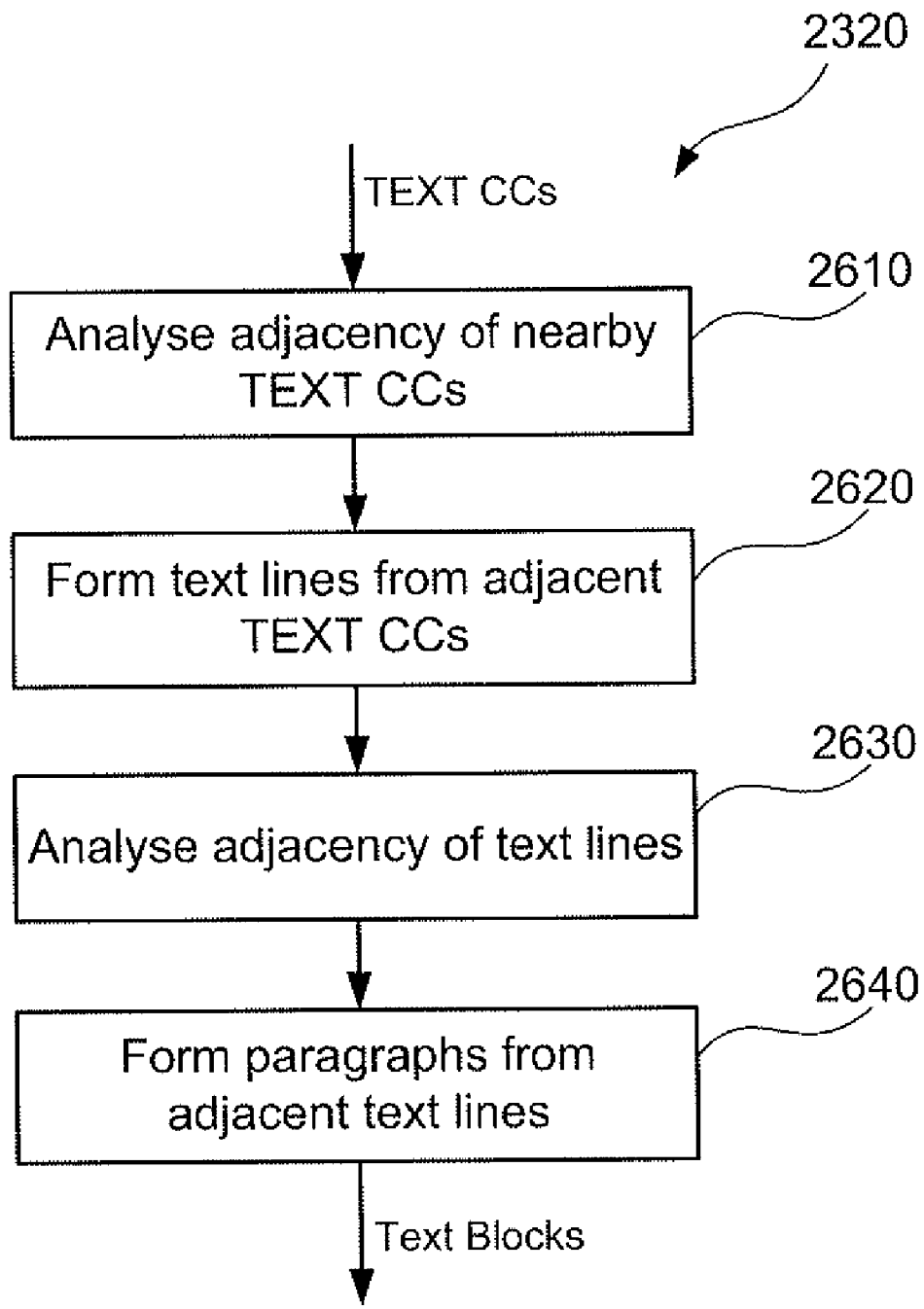
FIG. 26 is a flowchart of grouping TEXT CCs into logical text blocks in FIG. 23.

After the CC classification refinement process 2310, the refined TEXT CCs are ready to be grouped into logical text blocks at step 2320 mentioned above. FIG. 26 explains the process 2320 in detail, which groups TEXT CCs into text lines, which are then grouped into text paragraphs. A text line has a reading order direction in either the horizontal or vertical direction. Typically a horizontal text line consists of TEXT CCs with closer neighbouring TEXT CCs in horizontal direction than the neighbouring TEXT CCs in vertical direction. As seen in FIG. 26, initially step 2610 calculates the adjacency for each TEXT CC to other nearby TEXT CCs. In the present preferred implementation a nearest neighbour graph for each TEXT CC is calculated. Each TEXT CC has four nearest neighbours, one in each of the top, left, right, and bottom directions. Based on the neighbour information, each TEXT CC is assigned a text direction depending on the distance to its neighbours. A TEXT CC has a horizontal direction if the neighbour distance between the TEXT CC to its left or right neighbour is smaller than the neighbour distance between the TEXT CC to its top or bottom neighbour. The neighbour distance between two TEXT CCs is decided by the geometric distance in text direction, the alignment difference in the direction orthogonal to text direction and the text height difference.

Step 2620 forms text lines based on the assigned text direction for each TEXT CC. The text direction determines the direction of grouping. CCs with horizontal direction are grouped with its horizontal neighbours. CCs with vertical direction are grouped with its vertical neighbours. The dimension of the CCs at the direction orthogonal to the text direction is considered as text line height. CCs with same direction are grouped together if they are close to each other and align well in the text directions.

After text lines are formed, the text line adjacency analysis is performed at step 2630. Adjacent text lines of the same text direction within a predefined line distance are then grouped together to form text paragraphs in step 2640.

Recover Misclassified Non-Text CCs into Existing Text Blocks

Figure 27:
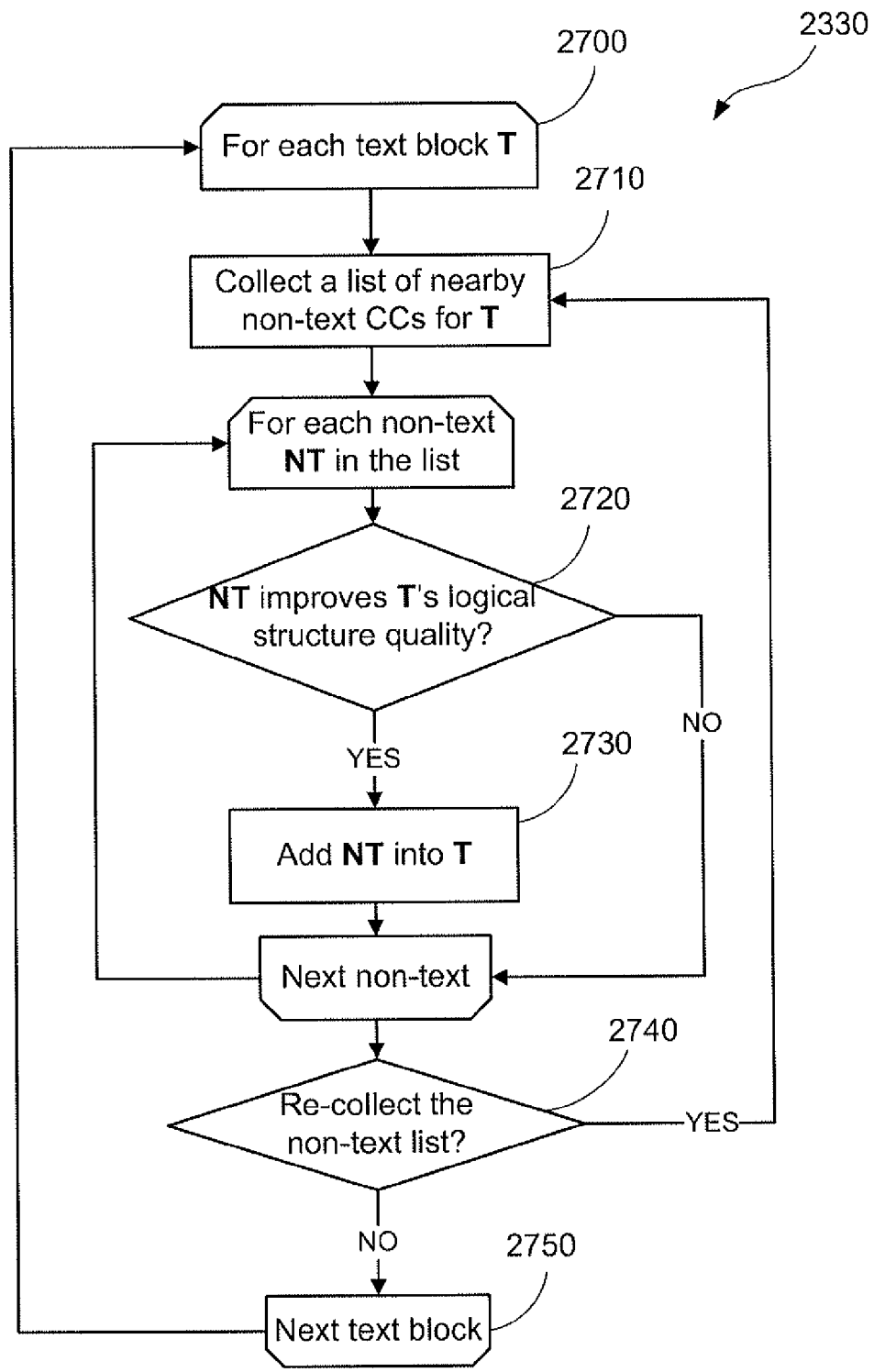
FIG. 27 is a flowchart of recovering misclassified CCs into existing text blocks in FIG. 23.

Once all TEXT CCS on the page are grouped into text blocks by process 2320, another classification refinement is performed by process 2330 which corrects text that have been misclassified as non-text. FIG. 27 explains the process 2330 of recovering misclassified non-text CCs into existing text blocks in detail. The process 2330 examines each text block at least once in at loop founded on step 2700 to recover the nearby misclassified non-text CCs that should have been part of the text block.

Step 2710 then operating of a text block T, collects a list of nearby non-text CCs for text block as the candidates for text recovery. Since the aim is to extend T, the bounding box of T is expanded slightly by a predefined distance D in the left, top, right and bottom directions. D is calculated based on T's average text line height. Preferably, D is two times of the average text line height of text block T. The non-text CCs that overlap with the expanded bounding box are collected.

Each non-text CC NT from the list collected in step 2710 is examined in step 2720 to check whether adding NT would improve T's logical structure quality. T's logical structure quality is improved, and NT is added into T at step 2730, if all of the following conditions are true:
  (i) the difference between T's text line height and NT's height is smaller than a predetermined amount of height difference (eg. <12 pixels); and
  (ii) NT's Coverage is higher than a predetermined amount of coverage (eg. >0.12, being the ratio of the number of pixels divided by bounding box area as previously defined); and
  (iii) the distance of NT to the closest CC in T is smaller than a predetermined amount in the text direction (eg. <average line height in pixels/2) and their colour difference is within a threshold (eg. <50 pixels, preferably the Manhattan distance difference for the three channels summed together, as described above); and
  (iv) the union bounding box of NT and T does not overlap with other text blocks on the page; and
  (v) NT and T align in text direction within a predetermined character alignment difference (eg. character alignment difference <10 pixels).

After all collected non-text CCs have been examined, step 2740 checks whether it is necessary to reconsider the non-text CCs that previously fail the test in step 2720. T's Bounding Box Area may be expanded by the addition of non-text CCs in step 2730. Non-text CCs that previously are not selected as candidates may become qualified after the bounding box expansion of T by step 2730. Step 2740 makes the decision on whether or not to repeat the text recovery process for T based on how much the bounding box of T has been expanded. If any of the left, right, top or bottom side is expanded more than 80% of D, text recovery for T is repeated. Otherwise the process moves on to the next text block at step 2750.

FIG. 31A-FIG. 31C are the sample diagrams demonstrating how text recovery process works. FIG. 31A is the original image which contains a text paragraph on a complex background. FIG. 31B is the output of process 2310-process 2320. The black parts in this figure are all perfect text and have been grouped together into a single text block, whereas the grey tints in this figure (i.e. those without the strikethrough line), including 3101 and 3102, are the CCs that have been misclassified as non-text. It will be apparent to a human observer that these grey tints are all perfect text as well, and should be grouped into the text block together with the other text characters on the page. FIG. 31C shows the output of process 2330, from which all the grey tints have been reclaimed back as TEXT and grouped into the nearby text block.

Remove Misclassified Text CCs from Text Blocks

Figure 28:
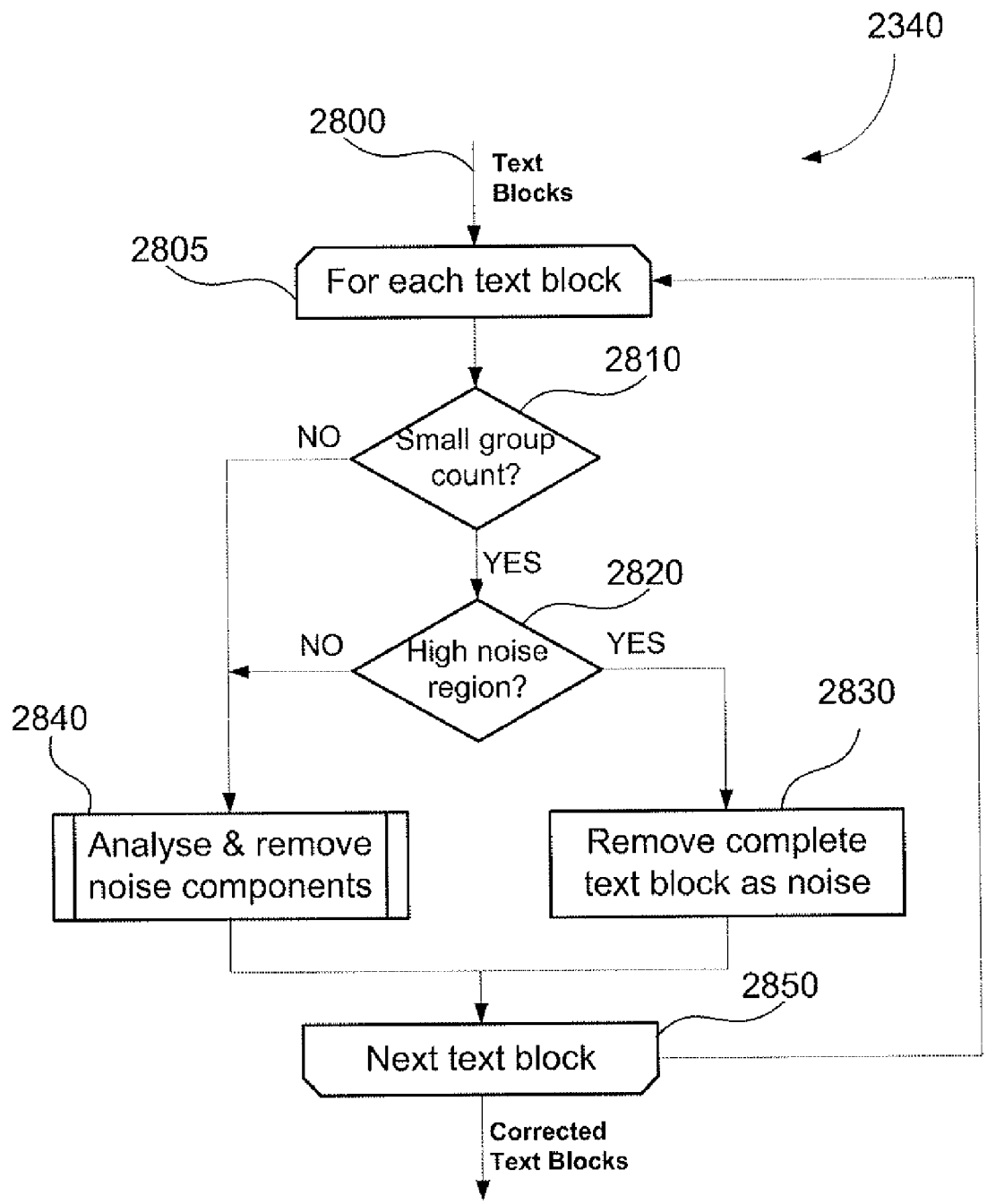
FIG. 28 is a flowchart of removing misclassified TEXT CCs from text blocks in FIG. 23.

The final stage 2340 of the text extraction process of FIG. 23 is the removal of incorrectly classified TEXT components from the text blocks, which is expanded as the flow diagram of FIG. 28. The process 2340 operates in a loop at step 2805 for each of the text blocks 2800 on the page, where the process 2340 attempts to identify and remove noise-like components of the text block, which may be a result of misrepresentation errors present in the source image, such as colour bleeding, or the result of incorrect text classifications. Additionally, it may be desirable to remove text decorations, such as outlines and drop shadows, which pose challenges to character recognition methods if both the text and decoration components are extracted.

The process 2340 examines each of the text blocks individually, and begins by first determining at step 2810 if the text block consists of only a small number of CCs, for example, fewer than three. If the text block does not contain many connected components, it is then checked at step 2820 to assess if the text block is closely spatially located to a large number of NOISE CCs. If this is the case, then it is most likely that the CCs of the text block have been falsely classified as TEXT, and so the entire contents of the text block are reclassified as NOISE at step 2830. In one example, the method 2340 determines if the text block is in a high noise region at step 2820 by examining any NOISE-classified CCs that touch the CCs of the text block. For each of those touched NOISE CCs, the bounding box area is accumulated, and if the sum total area is greater than twice the bounding box area of the text block, the text CCs are considered NOISE and removed at step 2830. In this fashion the removal of the extraneous CCs from a text block removes a text block if the contained CCs touch a significant noise area wherein the significance is measured as the ratio of accumulated area of the touched noise CCs to the area of the text block itself.

Otherwise, the text block is considered to at least partially consist of real text, and a more detailed analysis is conducted at step 2840 to determine if individual noise-like components, such as text decorations, can be removed. This process is expanded as the block diagram shown in FIG. 29, which is described in further detail below.

Following this process, the next text block of the page is retrieved at step 2850 from the memory 234 and is examined to remove other small isolated text blocks and text decoration components.

Figure 29:
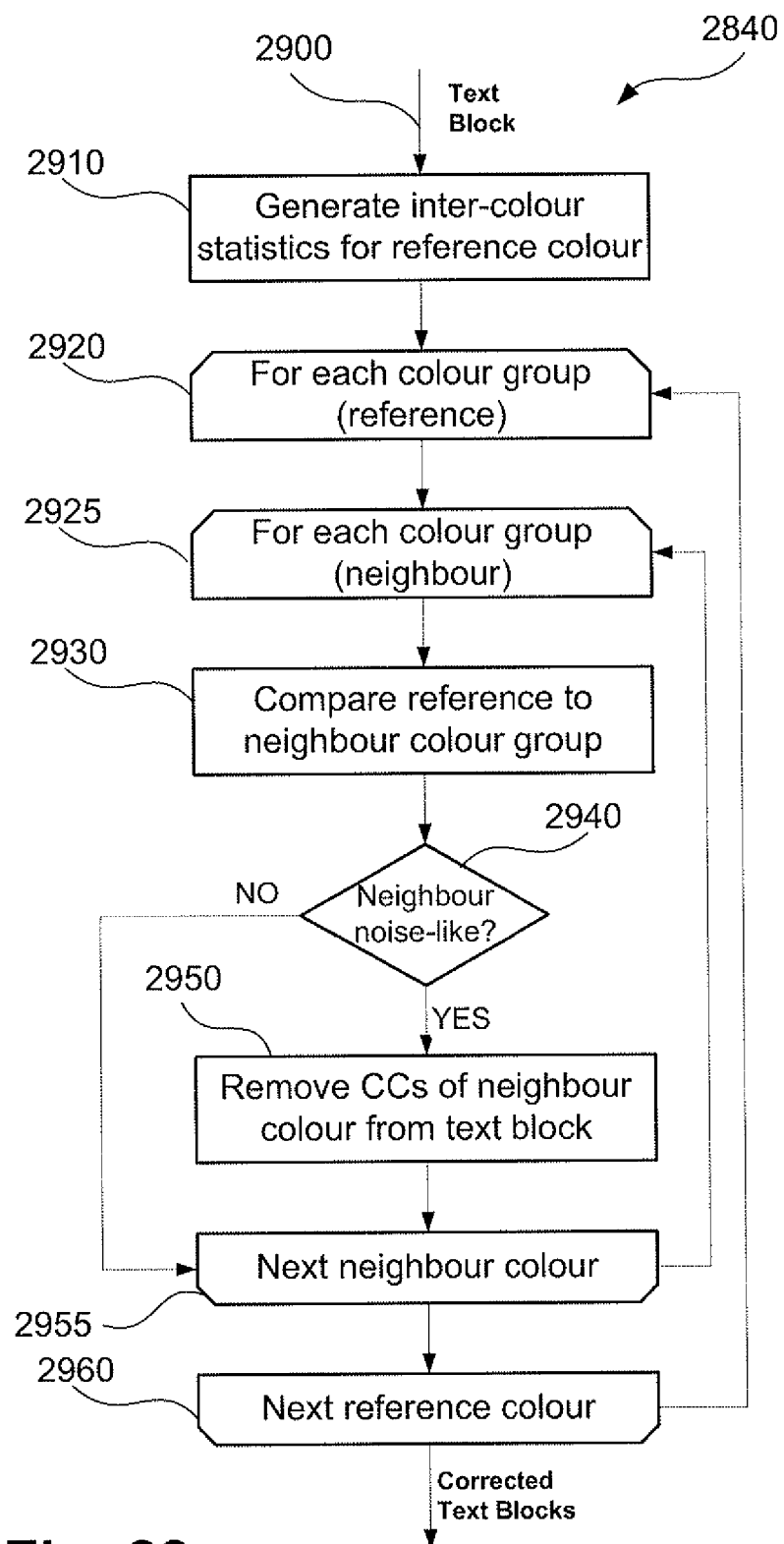
FIG. 29 is a flowchart of removing misclassified TEXT CCs from a text block.

The process 2840 of removing misclassified or extraneous components from a text block is shown in FIG. 29, to which is input a single text block 2900. The process module 2840 distinguishes undesirable TEXT components based on information about the colours present in the text block, which is generated by the first processing stage 2910. For each of the colour groups present in the text block, the process records information or statistics including:
  (i) Total CCs: The total number of CCs of this colour in the text block
  (ii) Pixel counts: The total Self Pixel Count for all CCs of this colour, and the average Self Pixel Count
  (iii) Inter-colour touching counts: The number of CCs of each other colour in the text block that CCs of this colour touch, as well as the total number of differently coloured CCs that CCs of this colour touch.

The processing of step 2840 as seen in FIG. 29 cycles through each of the colour groups present in the text block via a loop 2920, and evaluates each selected (reference) colour group against all other (neighbour) colour groups via a loop 2925. The process compares at step 2930 the reference and neighbour colour groups to determine if the neighbour colour group constitutes undesired noise such as text decorations. If so, the process 2840 removes all CCs of the neighbour colour from the text block at step 2950. In a preferred implementation the neighbour colour group is determined to be noise-like in step 2940 if both of the following conditions are fulfilled:
  (i) the average Self Pixel Count of the neighbour colour CCs is much smaller than that of the reference colour CCs (for example, less than 60%); and
  (ii) a significant portion of the neighbour coloured CCs touch CCs of any different colour, or the reference colour specifically (for example, greater than 40% and 60% respectively).

Step 2955 follows step 2950 and a "no" decision of step 2940 and obtains the next neighbour colour, returning the process to step 2925. Once all the neighbour colours have been processed, step 2960 accesses the next reference colour to return to the loop at step 2920. In this manner, all of the colours constituting a text block are examined, and small noise artefacts as well as larger text decoration components are excluded from the extracted output.

Figure 33A:
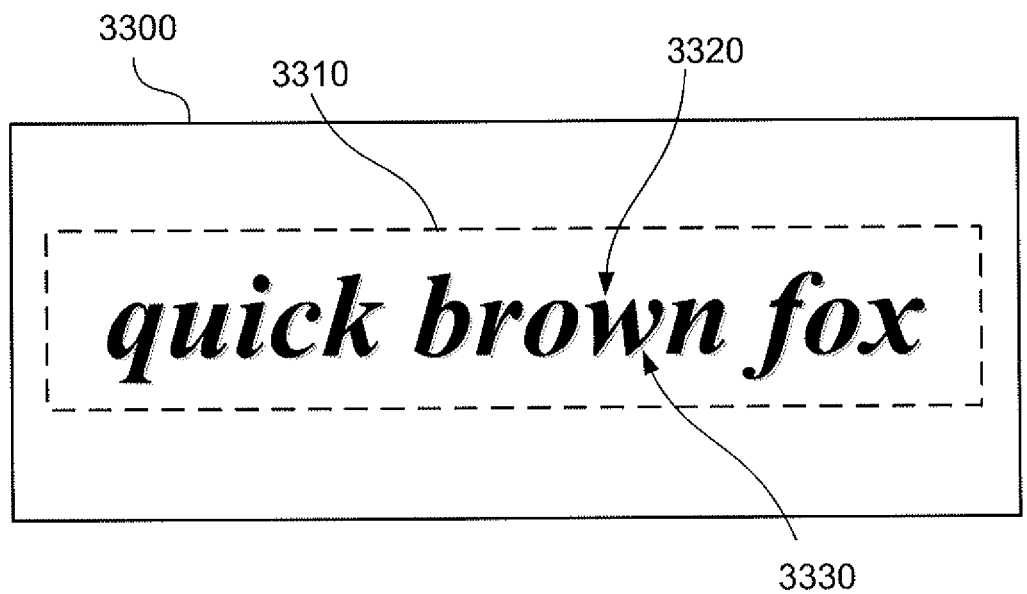
FIG. 33A-33B are examples demonstrating how misclassified TEXT CCs are removed from a text block.
Figure 33B:
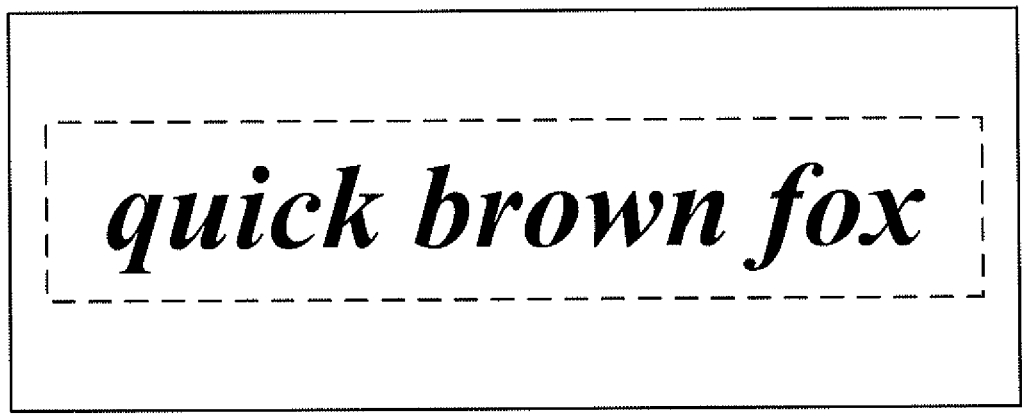

An example of the text removal process is shown in FIG. 33A, where it is desired to remove the shadowed text decoration from the extracted output. The input consists of a sample page 3300 containing a single text block 3310 in two colours having a main text component 3320, in black, which is desired to be retained, and the shadow component 3330, in grey, which is desired to be removed. It can be seen from FIG. 33A that the strokes of the shadow text characters are often "broken", where they have been overlapped by the main character strokes. This results in the decoration component consisting of a larger number of connected components than the main text, with a correspondingly smaller average pixel size. Accordingly, the process can determine at step 2940 that the shadow component 3330 should be removed, leaving only the main text component 3320 in the extracted output, as shown in FIG. 33B.

Some particular aspects of the present disclosure may be summarized as in the following labelled paragraphs:

(A) A computer implemented method of locating graphics objects in a colour compound document image, the method comprising the steps of
- (a) connecting similarly coloured pixels of the image into connected components (CCs) and placing the CCs in an enclosure tree;
- (b) classifying each CC into one of a plurality of classes wherein at least one class represents salient graphics components;
- (c) identifying a graphics container to perform semantic analysis for each CC of the class representing salient graphics components;
- (d) profiling descendents of the graphics container in the tree to obtain semantic context statistics; and
- (e) deciding whether the graphics container contains a whole or part of a graphics object based on the semantic context statistics.

(B) A method according to paragraph (A) wherein the class representing the salient graphics components includes characteristics of thin or low pixel density compared to a bounding box of the graphics container, the class being named outline class.

(C) A method according to paragraph (B) wherein step (c) of identifying a graphics container for an outline CC, comprises the steps of
- (ca) if the outline CC has no children, find a touching CC that has children and a total pixel count greater than 90% of the bounding box of the outline CC;
- (cb) find a child that has a total pixel count greater than 80% of the bounding box of the outline CC, and the child is the container;
- (cc) otherwise when a child of the outline CC is found, the outline CC is the container; and
- (cd) otherwise the outline CC is the container.

(D) A method according to paragraph (A) wherein step (d) of profiling the descendents of the graphics container calculates statistics selected from the group consisting of:
- (i) the number of pixels belong to a graphics object;
- (ii) the number of TEXT child CCs;
- (iii) the number of TEXT grandchild CCs;
- (iv) the number of NOISE CCs;
- (v) the sum of Total Pixel Count of NOISE CCs;
- (vi) the number of solid like CCs;
- (vii) the sum of Total Pixel Count of solid like CCs;
- (viii) the sum of Descendent Count of all child CCs;
- (ix) the sum of Enclosed Pixel Count of all child CCs; and
- (x) the number of graphics interior CCs.

(E) A method according to paragraph (D) wherein step (e) of deciding whether the container contains a whole or part of a graphics object comprises checking whether the graphics container CC contains graphics elements and potential text, based on the following conditions:

A. (i) the CC is not a good text container; and
   (ii) the number of pixels belong to a graphics object is greater than 50% of Bounding Box Area of the CC; and
   (iii) the number of TEXT grandchild CCs equals zero.
OR:
B. (i) the graphics container CC is classified as G_OUTLINE; and
   (ii) the number of child CCs that are useful for semantic context analysis equals the number of solid like CCs plus the number of TEXT child CCs; and
   (iii) the sum of Descendent Count of all child CCs equals zero.
OR:
C. (i) the graphics container CC is classified as G_OUTLINE; and
   (ii) the number of graphics interior CCs is greater than 50% of the number of child CCs that are useful for semantic context analysis; and
   (iii) the sum of Total Pixel Count of solid like CCs is greater than 90% Enclosed Pixel Count of the graphics container CC; and
   (iv) the sum of Enclosed Pixel Count of all child CCs is less than the sum of Total Pixel Count of NOISE CCs.

(F) A method according to paragraph (A) further comprising the steps of:
- (f) consolidating grouped graphics descendants;
- (g) consolidating touching childless CCs; and
- (h) consolidating flat CCs that are fully contained by a grouped graphics group.

(G) A method according to paragraph (A) further comprising storing the graphics container including the graphics object to a memory.

(H) A computer implemented method of text extraction in colour compound documents, the method comprising the steps of:
- (a) connecting similarly coloured pixels of an image of a colour compound document into connected components (CCs);
- (b) classifying each CC as either text or non-text;
- (c) refining text CC classification for each text CC using global colour context statistics;
- (d) grouping text CCs into text blocks;
- (e) recovering misclassified non-text CCs into a nearby text block; and
- (f) removing extraneous CCs from each text block using local colour context statistics to thereby provide the extracted text in the text blocks.

(I) A method according to paragraph (H) wherein the refining text CC classification comprises the steps of:
- (a) allocating each CC to a colour bucket using colour similarity and building bucket statistics for each colour bucket;
- (b) determining text colour likelihood for each colour bucket using the bucket statistics wherein text colour likelihood is determined by a text CC count, a total CC count, a total text CC pixel count and a total pixel count in each colour bucket; and
- (c) refining text CC classification for each text CC using the text colour likelihood.

(J) A method according to paragraph (I) wherein the refining text CC classification changes a text CC to noise if the text CC belongs to a colour bucket with zero text colour likelihood.

(K) A method according to paragraph (I) wherein the refining text CC classification changes a text CC to noise if the text CC has a similar colour to a surrounding background colour of the text CC.

(L) A method according to paragraph (I) wherein the refining text CC classification evaluates a touching text CC pair and changes one text CC of the pair to noise if one text CC of the pair has a significantly lower text colour likelihood compared to the other text CC of the pair.

(M) A method according to paragraph (I) wherein the refining text CC classification merges touching text CCs if the text colour likelihood of the touching text CCs are high and the touching text CCs have similar colours.

(N) A method according to paragraph (H) wherein step (f) of removing extraneous CCs from a text block comprises the steps of:
(fa) allocating each CC in the text block to a colour bucket by colour similarity and building statistics for each colour bucket;
(fb) collecting inter-colour buckets statistics;
(fc) determining one or more noise colour buckets based on average CC size and the number of touching CC in the colour bucket; and
(fd) removing CCs belonging to the noise colour bucket.

(O) A method according to paragraph (H) wherein the removing extraneous CCs from a text block removes a text block if the contained CCs touch a significant noise area wherein the significance is measured as the ratio of accumulated area of the touched noise CCs to the area of the text block.

(P) A method according to paragraph (H) wherein step (e) of the recovering misclassified non-text CCs into a nearby text block comprising the steps of:
(ea) collecting a list of non-text CCs located within a predefined distance to the nearby text block as candidate non-text CCs;
(eb) adding the candidate non-text CCs to the nearby text block when the candidate non-text CCs improve a logical structure quality of the nearby text block.

(Q) A method according to paragraph (P) wherein the predefined distance depends on the line height of the text block.

(R) A method according to paragraph (P) wherein the logical structure quality is improved based on the following conditions:
(i) the difference between a text line height of the nearby text block and a height of the candidate non-text CC is smaller than a predetermined amount; and
(ii) the candidate non-text CC's Coverage is higher than a predetermined amount; and
(iii) the distance of the candidate non-text CC to the closest CC in the nearby text block is smaller than a predetermined amount in the text direction and their colour difference is within a threshold; and
(iv) the union bounding box of the candidate non-text CC and the nearby text block does not overlap with other text blocks on the page; and
(v) the candidate non-text CC and the nearby text block align in text direction within a predetermined character alignment difference.

(S) A method according to paragraph (H) further comprising storing the extracted text to a memory device.

INDUSTRIAL APPLICABILITY

The arrangements described are applicable to the computer and data processing industries and particularly for the extraction of text and other data types from documents by processes for document analysis. Whilst the arrangements are described as being operable within a general purpose computer system (FIGS. 2A and 2B), the automation and absence of user control makes the arrangements well suited to incorporation into copier or photocopier apparatus where document pages are routinely scanned.

The foregoing describes only some embodiments of the present invention, and modifications and/or changes can be made thereto without departing from the scope and spirit of the invention, the embodiments being illustrative and not restrictive.

What is claimed is:

1. A computer implemented method of identifying at least one of a photo region and a graphics region in a colour bitmap image of a compound document, the method comprising:
connecting similarly coloured pixels of the image into connected components and placing the connected components in an enclosure tree, the enclosure tree forming a hierarchy of ancestor and descendent connected components where an ancestor connected component encloses a descendent connected component wherein each node of the enclosure tree is a connected component;
classifying each connected component into one of a plurality of classes wherein at least one class represents non-text connected components;
selecting a connected component from one of the non-text connected components of the enclosure tree;
calculating context statistics for the selected connected component based on descendent and touching sibling connected components of the selected connected component;
identifying whether the selected connected component contains at least one of a photo region and a graphics region based on the context statistics; and
storing the selected connected component identified as either graphics or photo object to memory.

2. A method according to claim 1 wherein the selecting step comprises:
selecting a non-text connected component with either a thin characteristic or low pixel density compared to a bounding box area of the non-text connected component;
selecting a child connected component of the non-text connected component as the selected connected component if the non-text connected component encloses the child connected component with a total pixel count greater than a first threshold based on an enclosed pixel count of the non-text connected component;
selecting the non-text connected component as the selected connected component if the non-text connected component encloses more than one child connected component and none of the child connected components have a total pixel count greater than the first threshold;
selecting a touching connected component of the non-text connected component as the selected connected component if the touching connected component has children and a total pixel count greater than a second threshold based on a pixel count of the bounding box of the non-text connected component.

3. A method according to claim 1 wherein the calculating context statistics step calculates, from descendent connected components, at least one statistic selected from the group of statics consisting of:
number of pixels belonging to a graphics object;
number of text child connected components;
number of text grandchild connected components;

number of noise connected components;
sum of total pixel count of noise connected components;
number of solid like connected components;
sum of total pixel count of solid like connected components;
sum of descendent count of all child connected components;
sum of enclosed pixel count of all child connected components; and
number of graphics interior connected components.

4. A method according to claim 1 wherein the calculating context statistics calculates, from touching connected components, at least one statistic of either a busy state of surrounding connected components or a colour difference range to touching siblings of the selected connected component.

5. A method according to claim 1 wherein the calculating context statistics step further comprises:
   calculating for the selected connected component at least one statistic selected from the group consisting of:
      a size and density histogram of text classified children; and
      a fragmentation state.

6. A method according to claim 1 wherein the identifying step further comprises:
   classifying the selected connected component as a good text container if a size and density histogram of text classified children has each of the following characteristics:
      a number of text classified children is greater than a third predetermined threshold;
      a mean of self pixel count of text classified children is greater than a forth predetermined threshold;
      a variance of self pixel count of text classified children is less than a fifth predetermined threshold.

7. A method according to claim 1 wherein a decision on whether the selected connected component contains a photo region depends on the size and density histogram of text classified children having no characteristics of a text paragraph.

8. A method according to claim 1 wherein the selected connected component identified as a graphics region is optimised by the steps of:
   consolidating grouped graphics descendants;
   consolidating-touching childless connected components; and
   consolidating flat connected components that are fully contained by a grouped graphics group.

9. A method according to claim 1 wherein selected connected component identified as a photo region is optimised by the steps of:
   consolidating a parent connected component if the parent connected component is not a good text container;
   consolidating any touching sibling non-text connected components if consolidating any of the touching sibling non-text connected components will increase a pixel density of a bounding box area of the photo region; and
   consolidating any touching sibling text connected components if any of the touching sibling text connected components are fully enclosed by the bounding box area of the photo region.

10. A non-transitory computer readable storage medium having a computer program recorded thereon, the program being executable by computer apparatus to identify at least one of a photo region and a graphics region in a colour bitmap image of a compound document, the program comprising:
   code for connecting similarly coloured pixels of the image into connected components and placing the connected components in an enclosure tree, the enclosure tree forming a hierarchy of ancestor and descendent connected components where an ancestor connected component encloses a descendent connected component wherein each node of the enclosure tree is a connected component;
   code for classifying each connected component into one of a plurality of classes wherein at least one class represents non-text connected components;
   code for selecting a connected component from one of the non-text connected components of the enclosure tree;
   code for calculating context statistics for the selected connected component based on descendent and touching sibling connected components of the selected connected component;
   code for identifying whether the selected connected component contains at least one of a photo region and a graphics region based on the context statistics; and
   code for storing the selected connected component identified as either graphics or photo object to memory.

11. A computer apparatus, the apparatus comprising a processor and a memory coupled to the processor, the memory having recorded thereon a program for identifying at least one of a photo region and a graphics region in a colour bitmap image of a compound document, the image being stored in the memory, the program comprising:
   code means executable by the processor for connecting similarly coloured pixels of the image into connected components and placing the connected components in an enclosure tree, the enclosure tree forming a hierarchy of ancestor and descendent connected components where an ancestor connected component encloses a descendent connected component wherein each node of the enclosure tree is a connected component;
   code means executable by the processor for classifying each connected component into one of a plurality of classes wherein at least one class represents non-text connected components;
   code means executable by the processor for selecting a connected component from one of the non-text connected components of the enclosure tree;
   code means executable by the processor for calculating context statistics for the selected connected component based on descendent and touching sibling connected components of the selected connected component;
   code means executable by the processor for identifying whether the selected connected component contains at least one of a photo region and a graphics region based on the context statistics; and
   code means executable by the processor for storing in the memory the selected connected component identified as either graphics or photo object.

12. A copier comprising:
   a scanner for scanning a compound document to form a colour bitmap image;
   a processor coupled to the scanner;
   a memory coupled to the processor for storing the colour bitmap image, the memory having recorded thereon a program executable by the processor for identifying at least one of a photo region and a graphics region in the colour bitmap image of the compound document, the program comprising:
      code means for connecting similarly coloured pixels of the image into connected components and placing the connected components in an enclosure tree, the enclosure tree forming a hierarchy of ancestor and descendent connected components where an ancestor connected component encloses a descendent connected component wherein each node of the enclosure tree is a connected component;

code means for classifying each connected component into one of a plurality of classes wherein at least one class represents non-text connected components;

code means for selecting a connected component from one of the non-text connected components of the enclosure tree;

code means for calculating context statistics for the selected connected component based on descendent and touching sibling connected components of the selected connected component;

code means for identifying whether the selected connected component contains at least one of a photo region and a graphics region based on the context statistics; and code means for storing in the memory the selected connected component identified as either graphics or photo object.

* * * * *